US012595379B2

(12) United States Patent
Zinn et al.

(10) Patent No.: US 12,595,379 B2
(45) Date of Patent: Apr. 7, 2026

(54) ARTICLES COATED WITH METAL NANOPARTICLE AGGLOMERATES

(71) Applicant: Kuprion, Inc., San Jose, CA (US)

(72) Inventors: Alfred A. Zinn, Palo Alto, CA (US); Rachel Brody, Garden Valley, CA (US); Randall M. Stoltenberg, Palo Alto, CA (US); Robert Roth, San Jose, CA (US); Khanh Nguyen, San Jose, CA (US); Nhi Ngo, San Jose, CA (US)

(73) Assignee: Kuprion, Inc., Waterbury, CT (US)

( * ) Notice: Subject to any disclaimer, the term of this patent is extended or adjusted under 35 U.S.C. 154(b) by 717 days.

(21) Appl. No.: 17/819,069

(22) Filed: Aug. 11, 2022

(65) Prior Publication Data

US 2023/0051591 A1 Feb. 16, 2023

Related U.S. Application Data

(60) Provisional application No. 63/231,783, filed on Aug. 11, 2021.

(51) Int. Cl.
| | |
|---|---|
| *C08K 3/08* | (2006.01) |
| *B82Y 30/00* | (2011.01) |
| *B82Y 40/00* | (2011.01) |
| *C09D 5/14* | (2006.01) |
| *C09D 7/40* | (2018.01) |
| *C09D 7/61* | (2018.01) |

(52) U.S. Cl.
CPC ............... *C09D 5/14* (2013.01); *B82Y 30/00* (2013.01); *B82Y 40/00* (2013.01); *C08K 3/08* (2013.01); *C09D 7/61* (2018.01); *C09D 7/67*

(2018.01); *C09D 7/68* (2018.01); *C08K 2003/085* (2013.01); *C08K 2201/005* (2013.01); *C08K 2201/011* (2013.01)

(58) Field of Classification Search
CPC ... C09D 7/61; C09D 7/67; C09D 7/68; C82Y 30/00; C82Y 40/00; C08K 3/08
USPC .......................................................... 428/551
See application file for complete search history.

(56) References Cited

U.S. PATENT DOCUMENTS

| | | | |
|---|---|---|---|
| 7,736,414 B1 | 6/2010 | Zinn | |
| 8,105,414 B2 | 1/2012 | Zinn | |
| 8,192,866 B2 | 6/2012 | Golightly et al. | |
| 8,486,305 B2 | 7/2013 | Zinn et al. | |
| 8,834,747 B2 | 9/2014 | Zinn | |
| 9,005,483 B2 | 4/2015 | Zinn et al. | |
| 9,095,898 B2 | 8/2015 | Zinn | |
| 9,700,940 B2 | 7/2017 | Zinn | |
| 2012/0114521 A1* | 5/2012 | Zinn ....................... B22F 1/102 75/343 | |
| 2013/0177504 A1* | 7/2013 | Macoviak ................ C09D 7/66 424/617 | |
| 2016/0201183 A1 | 7/2016 | Zinn | |

* cited by examiner

*Primary Examiner* — Katherine A Christy
(74) *Attorney, Agent, or Firm* — Carmody Torrance Sandak & Hennessey LLP

(57) ABSTRACT

Metal nanoparticle agglomerates may render the surface of an article biocidal toward microorganisms. Articles having a biocidal surface may comprise a coating comprising metal nanoparticle agglomerates adhered via an adhesive to at least a portion of a surface of the article. A coating formulation comprising metal nanoparticle agglomerates may be applied to the surface of an article to accomplish the foregoing.

19 Claims, 5 Drawing Sheets

ARTICLES COATED WITH METAL NANOPARTICLE AGGLOMERATES

BACKGROUND

Biofilms are groupings of bacteria that have aggregated on a surface and begun to synthesize extracellular polymeric substances that affix the bacteria firmly to the surface and to each other. The bacteria within a given biofilm may represent a substantially homogeneous bacterial population or a diverse range of different types of bacteria. The latter situation is very common. Bacteria within a biofilm are phenotypically different than are those of freely suspended planktonic bacteria, as the bacteria within a biofilm may perform rudimentary molecular signaling amongst each other through plasmid transfer. Gene regulation and transcription are also altered relative to their planktonic counterparts. As such, biofilms represent a matrix of single-celled organisms, potentially acting in cooperation (symbiosis) with each other and exchanging information, rather than a true multi-celled organism.

Overall, the structure of biofilms may vary widely in composition and complexity. The extracellular polymeric substance of biofilms comprises predominantly polysaccharides, typically neutral or anionic polysaccharides in the case of gram-negative bacteria and cationic polysaccharides in the case of gram-positive bacteria. Anionic polysaccharides may arise from attachment of uronic acids or ketal-linked pyruvates to the polysaccharide backbone, which may allow crosslinking to occur through complexation with divalent metal cations such as $Ca^{2+}$ and $Mg^{2+}$. Approximately 50-60% of the total organic carbon in biofilms arises from extracellular polymeric substances. The extracellular polymeric substances within biofilms provide a barrier between the bacteria and their external environment, thereby making the bacteria especially difficult to remediate using conventional agents, such as antibiotic substances. Depending on their location, additional components within the matrix of a biofilm may include, for example, mineral crystals, blood components, and the like. Association with other biological substances such as proteins, DNA, lipids and/or humic substances may also occur. Significant amounts of water may also be present.

Any type of solid-liquid interface may experience growth of a biofilm in the presence of a suitable conditioning fluid, which may be as simple as ordinary water in some cases. Especially susceptible surfaces may include those that are rougher due to their lower shear forces and higher surface area, and hydrophobic, non-polar surfaces such as polymers. Glass and metal surfaces are somewhat more resistant to biofilm formation, but they too usually become susceptible to biofilm formation over time. Certain liquids, such as biological fluids (e.g., saliva, blood, plasma, interstitial fluid, urine, tears, intravascular fluid, respiratory secretions, and the like) and most types of aqueous media contain trace or non-trace amounts of polymers that may deposit upon a surface and provide a conditioning film that may stimulate biofilm growth. The type of conditioning film in contact with a surface may dictate the rate and extent of biofilm formation. Additional factors impacting biofilm growth may include, for example, flow velocity in proximity to a surface, pH, nutrient levels, ionic strength, and temperature.

Greater than an estimated 80% of infections in humans involve biofilms, and they may not be effectively cleared by the immune system. Medical implants, such as catheters, central lines, IVs, stents, joint replacements, valve replacements, pacemakers, and other types of medical devices represent surfaces that may be especially susceptible toward biofilm growth. Bandages and other medical equipment placed upon the skin are also susceptible to biofilm formation. In addition, biofilms may even occur natively within the body, with plaque formation upon teeth being a familiar example.

If not effectively treated, biofilms within a human may progress to various types of infections such as endocarditis, pneumonia, blood stream infections, wound infections, laryngitis, and the like. Embolisms resulting from biofilm detachment and endotoxin formation from gram-negative bacteria may also be problematic. Antibiotics administered at maintenance doses may keep biofilm formation somewhat under control, but the doses may be problematic for the long-term health of a patient. Antibiotic resistance may also become more prevalent over time. Beyond antibiotics, the only effective solution for ridding a patient of biofilms is often mechanically removing the biofilm, such as through debriding/sloughing a wound or other surface or removing and replacing a medical implant, both of which may be costly and themselves present an undesirable health insult. Hydrophilic or superhydrophilic coatings applied to an implant before introduction to a patient may temper biofilm formation at least to some degree, but some types of surfaces may not be effectively treated with these types of coatings and doing so may increase production costs.

In addition to the medical space, biofilms may be present in a number of environmental settings where they may result in effects ranging from mere nuisance to causing significant damage. Non-limiting examples of locations where environmental biofilms may occur include, for example, boat hulls, submerged piers, pipelines and drains, oil production facilities, deep sea oil rigs, ornamental ponds and fountains, aquariums, swimming pools, food storage facilities, food processing facilities, slaughterhouses, water heaters, showers, bathtubs, toilets, kitchen gadgets such as sponges, children's toys, and the like. Like biofilms occurring internally within a human, environmental biofilms, once formed, may be most effectively removed through mechanical processes, often at significant expense.

The most straightforward way to address biofilm formation is by preventing the biofilm from forming in the first place, typically by rendering a surface biocidal. Even in situations where biofilm formation itself is not an issue, it may still be desirable to have at least some degree of biocidal activity imparted to a surface. For example, touch surfaces may be facile breeding grounds for microorganisms and represent a vector for transmission of diseases and infections. Aside from changing the biocidal properties of a given surface, coatings may also be applied to various surfaces in instances where it is desired to change surface properties, such as to alter surface wetting properties or improve the chemical resistance of a surface, for example. Such coatings may be temporary or permanent in nature, depending on the type and duration of surface modification that is needed in particular instances.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
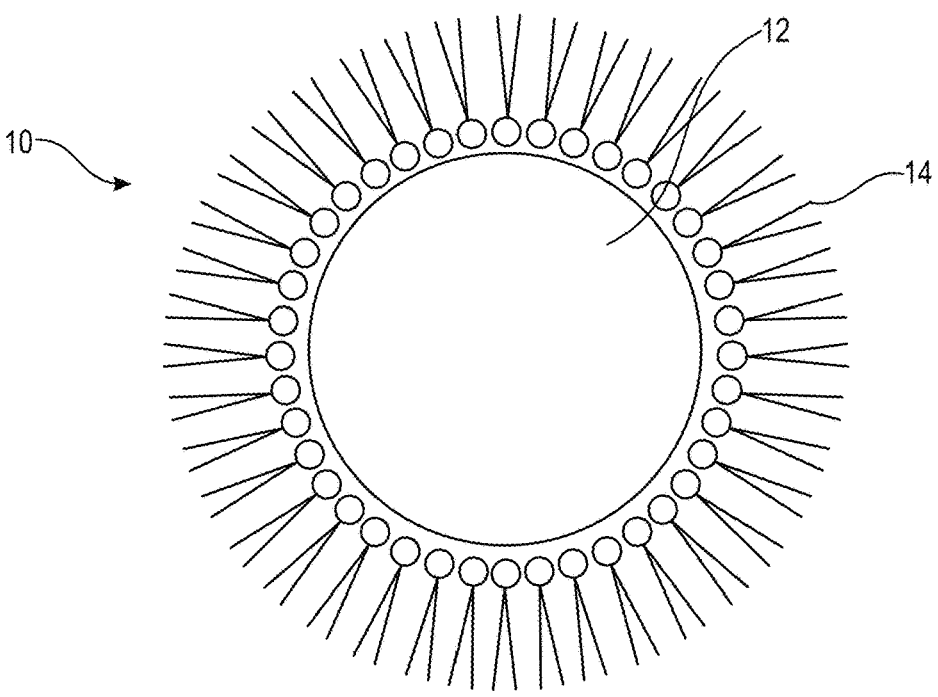
FIGS. 1 and 2 show diagrams of presumed structures of metal nanoparticles having a surfactant coating thereon.

The present disclosure relates to coatings for inhibiting biofilm formation and proliferation, and more particularly, articles adapted for fluid contact having an at least partial coating formed from metal nanoparticles in an amount effective to inhibit biofilm formation and proliferation. In addition to limiting biofilm formation, the coatings may also be effective to convey biocidal activity to touch surfaces and the surface of articles from which transfer of microorganisms may otherwise be problematic, including those not experiencing at least periodic fluid contact and for which biofilm formation is not necessarily an issue. In addition to conveying biocidal activity, coatings comprising metal nanoparticles adhered to the surface of an article may change other physical and chemical properties of the surface, which may be desirable in various instances.

As discussed above, biofilm formation may be problematic in a number of circumstances, both internally within a human and in various external environments. Some types of surfaces are more susceptible toward biofilm formation than are others. However, rendering a surface resistant toward biofilm formation may be difficult in various respects. Some coatings may not adhere adequately over the long term to an article susceptible to biofilm formation when the article's surface is in contact with a fluid, and certain types of coatings may be expensive or difficult to apply. Similar issues may be present for coatings applied to various surfaces for other purposes as well. For example, coatings may convey biocidal activity to a surface to limit transfer of microorganisms therefrom or to alter various surface properties, but such coatings may be difficult or expensive to apply as well.

Accordingly, the present disclosure provides articles having a coating comprising metal nanoparticles in a form suitable to afford long-term modification of a surface. The coatings may convey biocidal activity to the surface, which may render the surface less likely to form biofilms or to serve as a vector for transferring microorganisms and spreading disease. Advantageously, such coatings may be applied to at least a portion of the surface of an article after manufacturing thereof in order to modify properties of the surface in a desired way. For example, if use conditions so dictate, the surface of an article that is otherwise non-biocidal may be rendered resistant toward transferring viable microorganisms therefrom or forming a biofilm thereon. Moreover, the coatings may be formulated to withstand the anticipated use conditions to which the surface of an article is to be exposed, which may vary for different types of articles. Therefore, coatings comprising metal nanoparticles may be applied or re-applied to an article in response to a given situation where a surface modification is needed, either as a routine part of the article's manufacturing process or at a later time during the article's use.

In particular, the present disclosure provides articles having an at least partial coating of metal nanoparticle agglomerates upon a surface thereof, wherein the metal nanoparticle agglomerates are firmly adhered to the surface of the article. An adhesive may be present to promote adherence of the metal nanoparticle agglomerates to the surface, as well as provide additional advantages, discussed subsequently. The metal nanoparticle agglomerates may be present on the surface in an amount sufficient to prevent or severely limit the formation and growth of biofilms thereon and/or to convey biocidal activity to the surface. Provided there is a good distribution of metal nanoparticle agglomerates upon the surface of an article, even partial coatings may be effective for mitigating biofilm proliferation and growth and/or promoting biocidal activity according to the disclosure herein. Once microorganisms contact the metal nanoparticle agglomerates or individual metal nanoparticles released therefrom, the microorganisms may be killed or become inactivated, often through cell wall destruction, such that they are no longer capable of forming a biofilm or causing disease if transferred from a touch surface. Thus, coatings comprising metal nanoparticle agglomerates produce the opposite effect of a biofilm; instead of being protected when present upon a surface, microorganisms die or become inactivated at locations that might otherwise be susceptible to biofilm formation or touch surface transmission of a disease.

While copper and other bulk metal surfaces are known for their biocidal activity, it may be difficult in practice to introduce metals to the surface of certain types of articles due to the very high melting point of most metals. In addition, bulk metal surfaces may not have biocidal activity sufficient to preclude biofilm formation or offer rapid enough inactivation to prevent transfer of viable microorganisms from a touch surface. Metal nanoparticles in the form of metal nanoparticle agglomerates may alleviate this difficulty. Many types of metal nanoparticles may be used effectively for purposes of preventing biofilm formation or rendering a surface biocidal in the disclosure herein. Copper nanoparticles and their agglomerates, including partially oxidized form thereof, may be especially effective for preventing or limiting growth of biofilms upon the surface of an article or otherwise rendering the surface biocidal. Copper nanoparticles are especially advantageous compared to coating an article with molten copper, which forms at the melting point of copper (1083° C.), a temperature which is completely incompatible with many materials. Coatings formed through chemical or electrochemical reduction of a copper salt may likewise be difficult to form and maintain on the surface of various articles. Micron-size metal particles or flakes similarly may be difficult to introduce to an article with sufficient adherence to afford robust performance for inhibiting biofilms or promoting inactivation of microorganisms. In addition, the biocidal activity of micron-size metal particles or flakes may not be much different than the biocidal activity of a bulk metal surface, which may afford rather slow inactivation or killing of microorganisms, potentially leaving open the possibility of biofilm formation and/or microorganism transfer upon these types of surfaces.

Metal nanoparticles, particularly in the form of metal nanoparticle agglomerates, are an advantageous vehicle for introducing metals onto a surface in a highly active form effective for inhibiting biofilm formations and/or inactivating microorganisms to limit transfer thereof. Copper nanoparticles and/or silver nanoparticles may be particularly effective in this respect, given the known biocidal activity of these metals. $Cu_2O$ formed through at least partial surface oxidation of copper nanoparticles may be particularly effective in regard to the foregoing. A mixture of copper oxide(s) and zero-valent copper may be particularly desirable for conveying biocidal activity to a surface. The size of the copper nanoparticles and the size of metal nanoparticle agglomerates containing copper nanoparticles may be tailored to afford some production of $Cu_2O$, but not result in complete conversion of the copper nanoparticles into an oxide form, thereby maintaining a mixture of copper oxide and zero-valent copper.

Copper nanoparticles and other types of metal nanoparticles may further be used in combination with one another, which may afford complementary biocidal activity against the same or different types of microorganisms present upon the surface of an article. Silver nanoparticles may be utilized in combination with copper in some instances, for example. Zinc, nickel, titanium, cobalt, and other bioactive metals may be utilized in further combination with either of these metals as well, including their respective oxides and/or oxides of copper and/or silver, as well as with other additive substances that may convey biocidal activity against biofilm formation and/or that may promote inactivation of microorganisms.

As discussed further below, metal nanoparticles and their agglomerates may experience robust adherence to a surface following application thereto by virtue of the high surface energy of the metal nanoparticles. Additional surface adherence may be afforded through use of an adhesive, which may be chosen from among biologically compatible adhesives for internal (in vivo) or similar medical applications. Surprisingly, an adhesive may afford further advantages for rendering a surface biocidal and/or resistant toward biofilm formation by fixing metal nanoparticles agglomerates in an adhered form upon the surface while still allowing individual metal nanoparticles within the metal nanoparticle agglomerates to maintain a highly active and mobile form upon the surface for promoting biocidal activity.

With or without an adhesive being present, metal nanoparticle agglomerates may convey a time-release profile of individual metal nanoparticles or smaller nanoparticle agglomerates upon the surface of an article subject to biofilm formation or otherwise in need of having biocidal activity conveyed thereto. The time-release profile may maintain biocidal activity over extended periods of time by releasing a highly active metal form in proximity to a forming biofilm or pathogenic microorganisms, while also limiting toxicity toward mammalian cells. To this end, copper and other biocidal metals are advantageously non-toxic and non-mutagenic to humans (and may be beneficial in some cases, such as to aid in wound healing by skin cell regeneration and revascularization) while still being biocidal toward microorganisms with limited to no tendency toward promoting resistance or immunity. As referenced above and discussed further herein, an adhesive used in conjunction with adhering metal nanoparticle agglomerates to a surface may further facilitate such a time-release profile and regulate the release of individual metal nanoparticles from the metal nanoparticle agglomerates.

It is to be appreciated that any embodiment disclosed herein may employ metal nanoparticle agglomerates, even if not expressly stated as such in the description below. Thus, depending on context, use of the term "metal nanoparticles" herein may refer to individual metal nanoparticles, agglomerates of metal nanoparticles, or combinations of individual metal nanoparticles and metal nanoparticle agglomerates unless specified otherwise. Metal nanoparticle agglomerates may comprise a plurality of fused, partially fused, and/or unfused metal nanoparticles that are associated with one another upon the surface. In particular examples, at least a portion of the metal nanoparticles within the metal nanoparticle agglomerates may be unfused with one another, which may facilitate time-release of individual metal nanoparticles (including partially oxidized metal nanoparticles) or small clusters up metal nanoparticles upon a surface to promote biocidal activity.

Metal nanoparticles are uniquely situated to promote biocidal activity since they are readily capable of inactivating a range of bacteria, fungi, and viruses and precluding biofilm formation, are low toxicity to humans, especially in small amounts, and may be readily processed into spray formulations, dip coating formulations and other types of liquid coating formulations that may facilitate ready dispensation onto the surface of articles of various types. By pre-coating metal nanoparticles upon a surface, the surface may be rendered biocidal and preclude contamination from microorganisms and biofilms from occurring in the first place. Metal nanoparticles, such as copper nanoparticles, as described further herein, can be readily produced as individual metal nanoparticles and/or agglomerated forms thereof that have a size range compatible with their ready incorporation upon the surface of various articles subject to biofilm formation or in need of having biocidal activity conveyed thereto. The small size of the metal nanoparticles and their agglomerates allows ready distribution upon the surface of the article, optionally in a non-uniform, localized or gradient fashion, if needed, to provide protection against biofilm formation and proliferation and/or to convey biocidal activity to the surface. Furthermore, due to their high surface energy, metal nanoparticles and their agglomerates may become adhered to the surface of an article following deposition thereon, thereby providing a robust structure that is capable of repeated handling during operational use. Adherence of the metal nanoparticles and agglomerates thereof may involve chemical bond formation to the surface once the metal nanoparticles have attained a high surface energy state, as discussed further herein. An adhesive within the coating upon the surface of an article may alternately or additionally promote adherence of metal nanoparticle agglomerates thereto, as well as facilitate a time-release profile of active metal species. Polymer coatings comprising metal nanoparticle agglomerates may also provide additional advantages. Coatings formed from metal nanoparticle agglomerates may be applied to a surface much more readily than are other types of coatings capable of conveying biocidal activity and may be retained much more robustly due to the strong surface adherence resulting from the high surface energy of the metal nanoparticles.

Adhesives for promoting improved adherence of metal nanoparticle agglomerates to an article's surface may be introduced prior to, after, or while applying metal nanoparticle agglomerates to the surface. The adhesive, which may be permanently tacky, may be applied concurrently with the metal nanoparticle agglomerates or separately. Application of an adhesive to an article or a portion thereof prior to deposition of metal nanoparticle agglomerates thereon may afford initial sequestration of the metal nanoparticle agglomerates during loading before more robust surface adherence is realized following further processing of the metal nanoparticle to take advantage of the high surface energy of the metal nanoparticles, as discussed further below. Regardless of when introduced, the adhesive may further promote prolonged release (time-release) of active metal species from metal nanoparticle agglomerates following their adherence to the surface of an article. The prolonged, adhesive-mediated release of individual metal nanoparticles or small agglomerates of metal nanoparticles from larger metal nanoparticle agglomerates may limit mammalian toxicity while still providing sufficient free metal nanoparticles for rendering a surface biocidal, such as to inhibit formation of biofilms or to promote inactivation of microorganisms thereon.

Advantageously, metal nanoparticle agglomerates may be readily applied to an article through various techniques such as spraying, dip coating, painting, roller coating, printing, stenciling, and the like, thereby affording facile control of the extent of metal loading and the locations where a coating containing metal nanoparticle agglomerates is placed. Where needed, adhesives may be incorporated in a liquid coating formulation used in any of these processes. Even partial coatings may be sufficient to render a surface biocidal, since individual metal nanoparticles and other active metal species may be released in a highly mobile form from adhered metal nanoparticle agglomerates, thereby affording a higher effective surface coverage than that provided by the metal nanoparticle agglomerates alone.

In addition to adhesives, polymers may be optionally included in any coating formulation used herein for applying metal nanoparticle agglomerates upon a surface. Alternately, articles may be formed by extruding or electrospinning a blend of polymer and metal nanoparticle agglomerates to provide at least some surface coverage of metal nanoparticle agglomerates upon the article to convey biocidal activity thereto. For example, medical devices, such as stents, implants, and the like, may be formed from polymer blends containing metal nanoparticle agglomerates and optionally reinforcement fillers. In both polymer coatings and extruded articles, the metal nanoparticle agglomerates may be dispersed within the polymer to provide extensive surface coverage. The polymer alone may promote adherence of the metal nanoparticle agglomerates to the surface of the article, or the further adherence may be promoted with an adhesive or direct bonding promoted by the high surface energy of the metal nanoparticles. In addition, the polymer may be a dissolvable or degradable polymer, which may facilitate applying the metal nanoparticle agglomerates upon the article as a temporary surface coating that may be removed at a later time when biocidal activity and/or other like surface modifications are no longer needed. That is, metal nanoparticle agglomerates may be temporarily adhered to the surface of an article using a dissolvable or degradable polymer if desired. The polymer may be dissolvable or degradable under conditions that are compatible with both the anticipated use conditions of the article and with the metal nanoparticle agglomerates themselves. For example, the polymer may be at least partially soluble in water and/or degradable upon contacting an acid, provided the article is tolerant to these conditions. Upon dissolution or degradation of the polymer, the metal nanoparticle agglomerates may be removed from the surface if not otherwise adhered thereto, or remain adhered to the surface with an adhesive or as a consequence of the high surface energy.

Metal nanoparticle agglomerates may become adhered to the surface of an article during the article's manufacturing process or afterward. In some cases, metal nanoparticle agglomerates applied during an article's manufacturing process may take advantage of process-specific steps that may further facilitate adherence of the metal nanoparticle agglomerates to the surface of the article. As discussed below, metal nanoparticle agglomerates may become at least partially embedded in a polymer surface above the polymer's softening point in order to promote surface adherence thereto. In still another approach, metal nanoparticle agglomerates may become adhered to a metal surface by a "burn in" approach by heating the metal nanoparticle agglomerates on the surface for a few minutes at about 200-240° C. to promote fusion between the metal surface and a portion of the metal nanoparticles within the metal nanoparticle agglomerates.

Metal nanoparticles, properties of which are addressed in further detail below, represent a highly reactive metal form that may undergo ready adherence to a range of surface types once deposited in small droplet form thereon. Metal nanoparticles within metal nanoparticle agglomerates may be formulated such that they may be readily applied through spraying or other application processes (e.g., painting, dip coating, or the like) onto various types of surfaces. Surface types that may be coated with metal nanoparticle agglomerates in the disclosure herein include, for examples, glass, metal, ceramics, polymers, cement, textiles, and the like. Metal nanoparticles may become firmly adhered to a surface as a surfactant coating thereon is removed, as discussed below, and the adherence strength may be further supplemented by an adhesive, if needed. Alternately, a surfactant coating may remain intact upon the surface of metal nanoparticles within metal nanoparticle agglomerates, if the metal nanoparticle agglomerates are suitably bound to the surface of an article via an adhesive layer or polymer. In the case of polymer surfaces, additional surface adherence may be realized by heating the surface up to the softening point, such that the metal nanoparticle agglomerates become at least partially embedded in the surface, wherein the surfactant coating upon the metal nanoparticles may or may not be removed in the embedment process. At least partial surface coating with metal nanoparticle agglomerates may also be achieved when forming a blend of polymer and metal nanoparticle agglomerates into an article. Burn in to metal surfaces may also be performed.

Spray formulations comprising metal nanoparticle agglomerates may comprise an aerosolizable fluid medium in which an aerosol or similar droplets comprising metal nanoparticles may be generated. The aerosolizable fluid medium may be a gas or highly volatile liquid at room temperature and pressure, such that metal nanoparticle agglomerates may be rapidly deposited upon the surface of an article, with the surface being obtained in dry form essentially immediately or soon after spraying. Suitable spray formulations may utilize an aerosol propellant or a volatile solvent for spray pumping applications. Aerosol propellants may be particularly desirable due to their essentially instantaneous evaporation once discharged from their source, such as a spray can. Depending on the aerosolizable fluid medium used and the technique for application thereof, the aerosolized droplet size may range from about 10-150 microns for aerosol sprays and from about 150-400 microns for mechanically pumped sprays. The aerosolized droplets are easily directed to a specified location and do not linger overly long in air before settling on a surface.

Paints and dip coating formulations may similarly comprise metal nanoparticle agglomerates dispersed in a suitable fluid medium. Optional components that may be present in such formulations include, but are not limited to, polymers, viscosifiers, de-viscosifiers, surfactants, colorants, and the like. Surfactants present in a paint or dip coating formulation may be the same as or different than the surfactant(s) bound to the surface of the metal nanoparticles.

Suitable polymers that may be present in paints, spray coatings, dip coatings and the like are not believed to be especially limited, provided that the metal nanoparticle agglomerates remain satisfactorily dispersed therein. For coatings formed on medical devices and similar articles, suitable polymers may include Class VI-approved polymers like PTFE, FEP, PFA, TPE, PVDF, PEEK, LCP, ETFE, THV, polyimides, polyether block amides (e.g., PEBAX®), and nylon polyamides of various types. Dissolvable or degradable polymers such as polyvinyl alcohol, polylactic acid, polyglycolic acid, or the like may be used to form a temporary coating containing metal nanoparticle agglomerates upon the surface of an article, which may be subsequently removed once surface modification is no longer needed. Dissolvable or degradable polymers may also be used to form additional portions of an article beyond just a removable surface coating as well. When present, metal nanoparticle agglomerates may be dispersed in a polymer at about 0.5 to about 25 wt. % with respect to the polymer mass.

As used herein, the term "metal nanoparticles" refers to metal particles that are about 250 nm or less in size, particularly about 200 nm or less, or about 150 nm or less in size, without particular reference to the shape of the metal particles. Copper nanoparticles are metal nanoparticles comprising predominantly copper, optionally with an oxide coating wholly or partially covering the surface of the copper nanoparticles. Likewise, silver nanoparticles are metal nanoparticles comprising predominantly silver, optionally with an oxide coating wholly or partially covering the surface of the silver nanoparticles. The term "metal nanoparticle" broadly refers herein to any metallic structure having at least one dimension of 250 nm or less, particularly about 200 nm or less or about 150 nm or less, and includes other structures that are not substantially spherical in nature, such as metal platelets/disks, metal nanowires, or the like. Other metal nanostructures may be used in addition to or as alternatives to spherical or substantially spherical metal nanoparticles or agglomerates thereof in the disclosure herein. The metal nanoparticles or similar nanostructures may also feature a surfactant coating, which may prevent fusion of the metal nanoparticles from taking place and aid in forming metal nanoparticle agglomerates in some instances. The surfactant coating may or may not be removed or lost as the metal nanoparticles become adhered to a surface. If the surfactant coating is removed, the metal nanoparticles may or may not become at least partially fused to one another.

In particular examples herein, metal nanoparticle agglomerates may become adhered to the surface of an article via an adhesive. The surfactant coating of the metal nanoparticles within the metal nanoparticle agglomerates may remain intact prior to and while the metal nanoparticles agglomerates become adhered via the adhesive. Optionally, a polymer may be present in combination with the adhesive or as an alternative to the adhesive. After the metal nanoparticles become adhered to the surface of the article via the adhesive (or polymer), the surfactant coating may be removed from the metal nanoparticles. Surfactant-free metal nanoparticles within the metal nanoparticle agglomerates may remain unfused with one another, provided the temperature is not too high, and may be undergo time-release as individual metal nanoparticles or small metal nanoparticle clusters to convey biocidal activity to the article.

The term "metal nanoparticle agglomerates" and equivalent grammatical forms thereof refers to a grouping of metal nanoparticles having at least one dimension ranging from about 0.1 to about 35 microns in size, particularly about 0.1 to about 15 microns in size, or about 0.1 to about 5 microns in size. Individual metal nanoparticles within a metal nanoparticle agglomerate may reside within the size ranges indicated above, and the individual metal nanoparticles may be associated with one another through non-covalent, covalent, or metallic bonding interactions. The term "associated" refers to any type of bonding force that maintains a grouping of metal nanoparticles together. Non-covalent bonding interactions between metal nanoparticles may include physical entanglement of surfactants and other additives bound to the surfaces of the metal nanoparticles. The bonding force may be overcome to produce individual metal nanoparticles in some instances. For example, the bonding force may be overcome as individual metal nanoparticles are released upon a surface to convey biocidal activity thereto.

The terms "consolidate," "consolidation" and other variants thereof are used interchangeably herein with the terms "fuse," "fusion" and other variants thereof.

Once a surfactant coating has been lost from the surface of metal nanoparticles, as discussed further below, surface oxidation of the metal nanoparticles may also lead to formation of reactive and potentially mobile salt compounds upon the surface of an article. Such salts may include, for example, chlorides, bisulfites and bicarbonates. Chlorides, for example, may result from chloride ions in sweat or other bodily fluids. Formation of such salts may be particularly prevalent upon exposure of the metal nanoparticles to a moist environment, as specified for a bicarbonate salt in Reaction 1 below. Dry conditions, in contrast, may favor formation of at least a partial oxide coating upon the surface of the metal nanoparticles (Reaction 2).

$$Cu + \tfrac{1}{2}O_2 + H_2O + 2CO_2 \rightarrow Cu(HCO_3)_2 \quad \text{(Reaction 1)}$$

$$2Cu + \tfrac{1}{2}O_2 \rightarrow Cu_2O \quad \text{(Reaction 2)}$$

The salts may be surfactant-stabilized salt complexes comprising one or more surfactants (e.g., one or more amine surfactants in the case of copper nanoparticles) and sufficient salt anions to achieve charge balance. Charge balancing anions may include, for example, halogen, particularly chloride; bisulfite; bicarbonate; lactate; or the like. The charge balancing anions are relatively labile and may be released to generate open coordination sites upon the metal for binding DNA, proteins, or like biomolecules. The surfactant-stabilized salt complexes may be relatively mobile upon the surface of an article, even when bound within or upon an adhesive, and provide a higher effective coverage of metal nanoparticles thereupon compared to if they remained fully fixed in place. In some cases the surfactant-stabilized salt complexes may be carried over the surface of an article when bound to individual metal nanoparticles released from the metal nanoparticle agglomerates.

In addition to salt compounds or surfactant-stabilized forms thereof formed in situ during use, metal salts or surfactant-stabilized forms thereof may be combined with metal nanoparticles or metal nanoparticle agglomerates prior to deposition of the metal nanoparticle agglomerates upon a surface in need of being rendered biocidal. Any of the preceding counteranion forms of the metal salts may be utilized in the disclosure herein. Surprisingly, metal salts or surfactant-stabilized forms thereof may themselves aid in killing or inactivating microorganisms upon release from metal nanoparticle agglomerates. When present, the added metal salt compounds may be present at a ratio ranging from about 1 to about 0.001, or about 0.01 to about 0.001, or about 1 to about 0.1, or about 0.1 to about 0.001, each on a weight basis with respect to the metal nanoparticles. The added metal salt compounds may also be deposited upon a surface separately from the metal nanoparticle agglomerates, such as by forming a solution of metal salt in a solvent such as an alcohol or acetone, for example, which may be contacted with the surface through spraying, dip coating, or a similar application technique. The concentration of metal salt in a spray or dip coating formulation may range from about 0.5 ppm to about 50 ppm. The coating density of the added metal salt upon a surface, such as a fabric or polymer film, may range from about 0.01 to about 0.5 mg/in$^2$ or about 0.01 mg/in$^2$ to about 0.1 mg/in$^2$.

In some embodiments, added metal salt compounds may be associated with amine, sulfur, or phosphate functional groups upon a functionalized polymer. The metal salt compounds may be associated with the functional groups by a metal-ligand bond (e.g., in the case of an amine-functionalized polymer) or through salt formation (e.g., in the case of a sulfonic acid-functionalized polymer). Thiol-functionalized polymers or sulfide-functionalized polymers may also coordinate added metal salt compounds.

Disulfide-crosslinked polymers, in the presence of a suitable reducing agent, may similarly coordinate added metal salt compounds. Reactions 3-5 below show some of the transformations that added CuCl$_2$ may undergo (R is a polymer chain).

$$R\text{---}SO_3H + CuCl_2 \rightarrow R\text{---}SO_3\text{---}CuCl + HCl \qquad \text{(Reaction 3)}$$

$$R\text{---}NH_2 + CuCl_2 \rightarrow R\text{---}NH_2CuCl_2 \qquad \text{(Reaction 4)}$$

$$R_2S + CuCl_2 \rightarrow R_2SCuCl_2 \qquad \text{(Reaction 5)}$$

Before discussing more particular aspects of the present disclosure in further detail, additional brief description of metal nanoparticles and their processing conditions, particularly silver or copper nanoparticles, will first be provided. Metal nanoparticles exhibit a number of properties that can differ significantly from those of the corresponding bulk metal. One property of metal nanoparticles that can be of particular importance for processing is nanoparticle fusion (consolidation) that occurs at the metal nanoparticles' fusion temperature. As used herein, the term "fusion temperature" refers to the temperature at which a metal nanoparticle liquefies, thereby giving the appearance of melting. At or above the fusion temperature, consolidation with other metal nanoparticles may readily take place. As used herein, the terms "fusion" and "consolidation" synonymously refer to the coalescence or partial coalescence of metal nanoparticles with one another to form a larger mass. Metal nanoparticles within a metal nanoparticle agglomerate may undergo fusion with one another or individual metal nanoparticles may become fused as well, thereby forming a network of at least partially fused metal nanoparticles in either case. In some embodiments described herein, at least a portion of the metal nanoparticles in the metal nanoparticle agglomerates may remain unfused with one another when adhered to a surface of an article. Provided the metal nanoparticles remain sufficiently unfused, individual metal nanoparticles may be released from the metal nanoparticle agglomerates to convey biocidal activity to a surface.

Advantageously and surprisingly, metal nanoparticles, such as copper nanoparticles and/or silver nanoparticles, for example, can become adhered to various types of surfaces even well below their fusion temperature, thereby allowing surface bonding to take place, as discussed further herein. Depending on the density at which the metal nanoparticles within metal nanoparticle agglomerates are loaded onto a surface and the temperature at which they are processed thereon, individual metal nanoparticles may or may not be further fused together when adhered thereto. Desirably, the metal nanoparticles within metal nanoparticle agglomerates adhered to a surface may remain at least partially unfused, preferably substantially unfused, to facilitate time-release of metal nanoparticles and metal nanoparticle clusters (smaller metal nanoparticle agglomerates) from larger metal nanoparticle agglomerates, but not in a form such that the individual metal nanoparticles are substantially released in free form in vivo. Rather, the individual metal nanoparticles or other active metal forms thereof (e.g., oxidized metal nanoparticles, metal ions, and/or metal ion clusters) may remain upon the surface in mobile form to convey biocidal activity to the surface. When applying metal nanoparticle agglomerates to the surface of an article, further heating may or may not be performed, depending upon the extent of metal nanoparticle fusion that is desired. Preferably, no heating or limited heating (e.g., below the fusion temperature) is performed so that the metal nanoparticles within metal nanoparticle agglomerates remain substantially unfused to each other upon the surface of the article.

Upon decreasing in size, particularly below about 20 nm in equivalent spherical diameter, the temperature at which metal nanoparticles liquefy drops dramatically from that of the corresponding bulk metal. For example, copper nanoparticles having a size of about 20 nm or less can have fusion temperatures of about 220° C. or below, or about 200° C. or below, or even about 175° C. or below in comparison to bulk copper's melting point of 1083° C. Silver nanoparticles may similarly display a significant deviation from the melting point of bulk silver below a nanoparticle size of about 20 nm. Thus, the consolidation of metal nanoparticles taking place at or above the fusion temperature as a result of the high surface energy can allow structures containing bulk metal to be fabricated at significantly lower processing temperatures than when working directly with the bulk metal itself as a starting material. Although metal nanoparticles having a size of about 20 nm or under may be advantageous in some situations, even larger metal nanoparticles may be suitable in the disclosure herein when utilized within metal nanoparticle agglomerates. For example, larger metal nanoparticles (e.g., about 20 nm to about 250 nm, or about 50 nm to about 250 nm, or about 100 nm to about 200 nm, or about 75 nm to about 250 nm) may retain biocidal activity and a high surface energy for promoting adherence to a surface but with less propensity for becoming fused to one another and lowering the biocidal activity. In either case, metal nanoparticles may facilitate metal deposition and robust metal adherence upon various surfaces that would otherwise be thermally incompatible with the processing temperatures required to introduce molten metal thereon. The small particle sizes of the metal nanoparticles and their agglomerates may further promote ready dispersion within coating formulations suitable for application upon a surface.

A number of scalable processes for producing bulk quantities of metal nanoparticles in a targeted size range have been developed. Most typically, such processes for producing metal nanoparticles take place by reducing a metal precursor in the presence of one or more surfactants. The as-isolated metal nanoparticles may have a surfactant coating thereon and be isolated as a plurality of nanoparticle agglomerates. The agglomerates may be broken apart, while retaining the surfactant coating, or the agglomerates may be used directly without further processing. Particularly advantageous metal nanoparticle may range from about 50 nm to about 250 nm in size or about 100 nm to about 250 nm in size, since they may be retained more easily upon a surface, especially in agglomerated form, are less prone to becoming prematurely fused to one another by virtue of their high fusion temperatures, and are more oxidation-resistant than are smaller nanoparticles. Thus, in particular embodiments of the present disclosure, at least a majority (e.g., >50%, >60%, >70%, >80%, or >90%) of the metal nanoparticles within the metal nanoparticle agglomerates adhered to a surface may be about 50 nm to about 250 nm in size or about 100 nm to about 250 nm in size. Optionally, metal nanoparticle agglomerates having metal nanoparticles within this size range may be present in combination with at least some metal nanoparticles that are about 20 nm or under in size. The metal nanoparticle agglomerates, by virtue of containing a range of metal nanoparticle sizes, may convey a time-release profile of individual metal nanoparticles or smaller metal nanoparticle agglomerates upon the surface of an article. While present, the surfactant coating upon the metal nanoparticles may facilitate surface adhesion through van der Waals interactions. After surfactant loss takes place, a highly active metal form to promote surface adherence may be realized. An adhesive may also promote surface adherence until more robust bonding resulting from the high surface energy is realized.

Metal nanoparticle agglomerates may be of an advantageous size range to facilitate dispensation via spraying or other coating processes and to promote retention upon a surface, such an agglomerate size ranging from about 0.1 microns to about 35 microns, or about 0.1 microns to about 15 microns, or about 0.1 microns to about 5 microns. The metal nanoparticles or agglomerates thereof can be isolated and purified from a reaction mixture by common isolation techniques and processed into a suitable spray formulation or similar coating formulation for surface dispensation. The surfactant coating upon the metal nanoparticles may be removed through gentle heating, gas flow, and/or vacuum (any pressure below atmospheric pressure) once the metal nanoparticles have been deposited upon a surface of an article, thereby affording a much higher surface energy and a commensurate increase in reactivity. Alternately, the surfactant coating may be lost upon extended contact with a surface without undergoing additional heating or other processing, with adherence to the surface occurring following surfactant loss. The surfactant coating may remain for at least some period of time upon the surface of an article, such that the metal nanoparticles are retained as individuals thereon, particularly within metal nanoparticle agglomerates, without becoming fused to each other. Once the surfactant coating has been removed or lost, the high surface energy of the metal nanoparticles may facilitate adherence of the metal nanoparticles to the surface through chemical bonding. The metal nanoparticles may become fused together during this process or they may remain unfused depending on temperature conditions, but preferably the metal nanoparticles within the metal nanoparticle agglomerates remain unfused to promote biocidal activity by releasing individual metal nanoparticles or other active metal species from the metal nanoparticle agglomerates. Alternately or in addition, the metal nanoparticles may become at least partially oxidized as a surfactant coating is lost. In some application utilizing metal nanoparticles, oxidation is to be avoided; however, at least some extent of oxidation may be desirable when rendering a surface biocidal in view of the synergy achievable when a mixture of metal oxide and zero-valent metal are present.

Coatings having a range of different metal nanoparticle agglomerate sizes may release metal nanoparticles and even smaller clusters of metal nanoparticles at different rates upon the surface of an article but without resulting in substantial release in vivo. As metal nanoparticles or similar active metal species are released from the metal nanoparticle agglomerates at different rates, the metal nanoparticles or small clusters thereof may migrate over a surface to afford biocidal coverage that is more complete than the actual coverage density of the metal nanoparticle agglomerates upon the surface. Thus, the metal nanoparticles may attack bacteria or other microorganisms in contact with any portion of the surface, so long as metal nanoparticle agglomerates are sufficiently close by to provide metal nanoparticles to the surface in a mobile form that remains constrained to the surface. By differentially releasing metal nanoparticles from metal nanoparticle agglomerates having a range of sizes upon an article's surface, further enhancement of the time-release profile may be realized to afford prolonged and rapid biocidal activity to a surface. Thus, activity against biofilm formation and proliferation and/or biocidal activity may be retained over several days, such as at least about 3 days, or at least about 5 days, or at least about 7 days, or at least about 10 days, or at least about 14 days, or at least about 21 days, or at least about 30 days. An adhesive in contact with the metal nanoparticle agglomerates may further modulate the time-release profile of metal nanoparticles upon the surface of an article while limiting release of free metal nanoparticles from the surface. Suitable adhesives are not considered to be particularly limited and are specified in more detail below. For in vivo applications, biologically compatible adhesives may be preferred.

Any suitable technique can be employed for forming the metal nanoparticles and metal nanoparticle agglomerates used in the disclosure herein. Particularly facile metal nanoparticle fabrication techniques, particularly for copper nanoparticles, are described in U.S. Pat. Nos. 7,736,414, 8,105, 414, 8,192,866, 8,486,305, 8,834,747, 9,005,483, 9,095,898, and 9,700,940, each of which is incorporated herein by reference in its entirety. Similar procedures may be used for synthesizing other types of metal nanoparticles and agglomerates thereof. As described therein, metal nanoparticles can be fabricated in a narrow size range and/or a designed size distribution by reduction of a metal salt in a solvent in the presence of a suitable surfactant system, which can include one or more different surfactants. Further description of suitable surfactant systems follows below. Tailoring of the surfactant system, the reaction concentration, temperature, and like factors may determine the size range of metal nanoparticles that are obtained from a metal nanoparticle synthesis. Without being bound by any theory or mechanism, it is believed that the surfactant system can mediate the nucleation and growth of the metal nanoparticles, limit surface oxidation of the metal nanoparticles while the surfactant system is adhered thereto, and/or inhibit metal nanoparticles from extensively aggregating with one another prior to being at least partially fused together. As noted above, small agglomerates of metal nanoparticles may be formed in many instances and used in the disclosure herein. Suitable organic solvents for solubilizing metal salts and forming metal nanoparticles can include, for example, formamide, N,N-dimethylformamide, dimethyl sulfoxide, dimethylpropylene urea, hexamethylphosphoramide, tetrahydrofuran, glyme, diglyme, triglyme, tetraglyme, proglyme, or polyglyme. Reducing agents suitable for reducing metal salts and promoting the formation of metal nanoparticles can include, for example, an alkali metal in the presence of a suitable catalyst (e.g., lithium naphthalide, sodium naphthalide, or potassium naphthalide) or borohydride reducing agents (e.g., sodium borohydride, lithium borohydride, potassium borohydride, or tetraalkylammonium borohydrides). In non-limiting examples, reduction of the metal salt to form metal nanoparticles and agglomerates thereof may take place under substantially anhydrous conditions in a suitable organic solvent.

Figure 2:
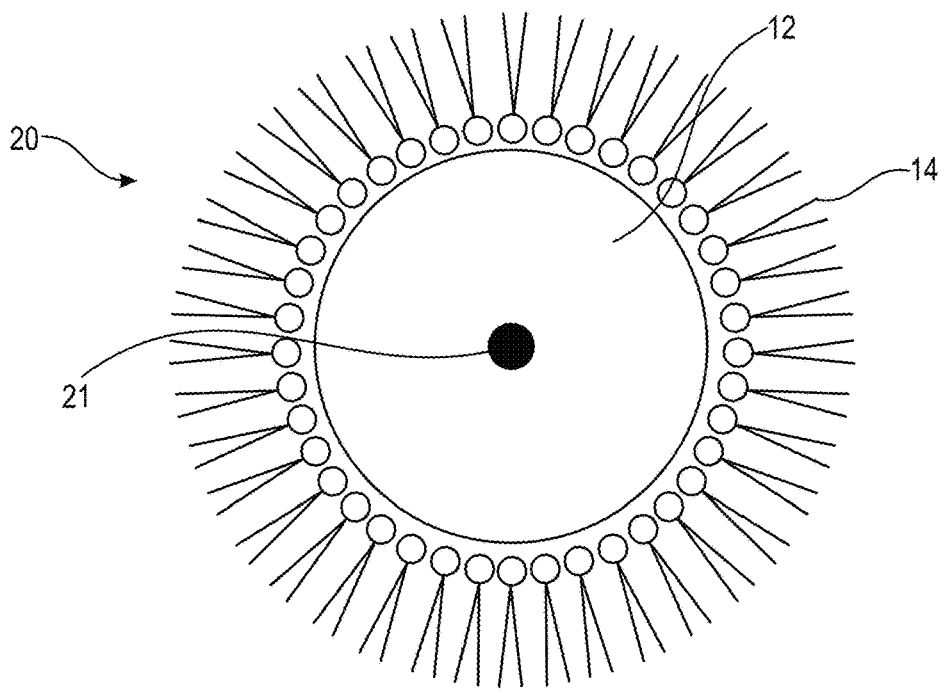
Figure 3:
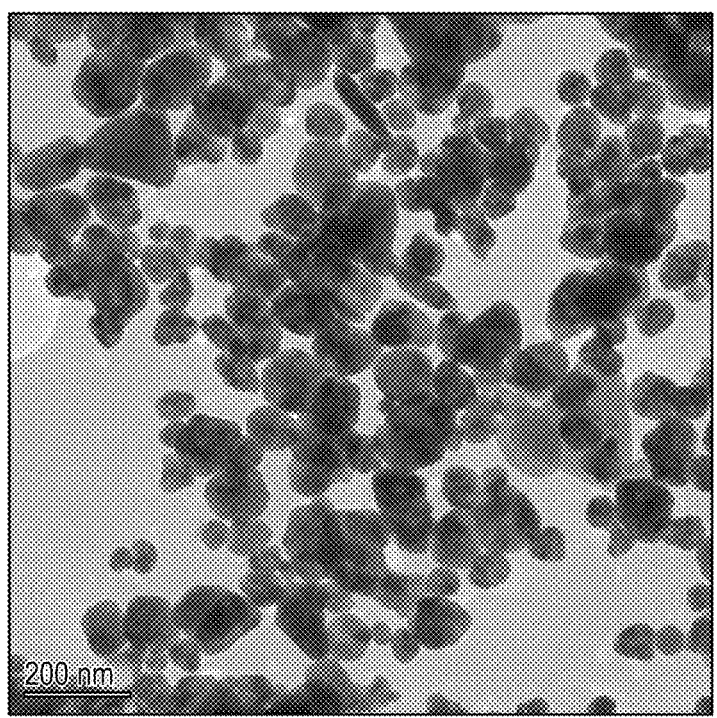
FIG. 3 shows an illustrative SEM image of substantially individual copper nanoparticles.
Figure 4:
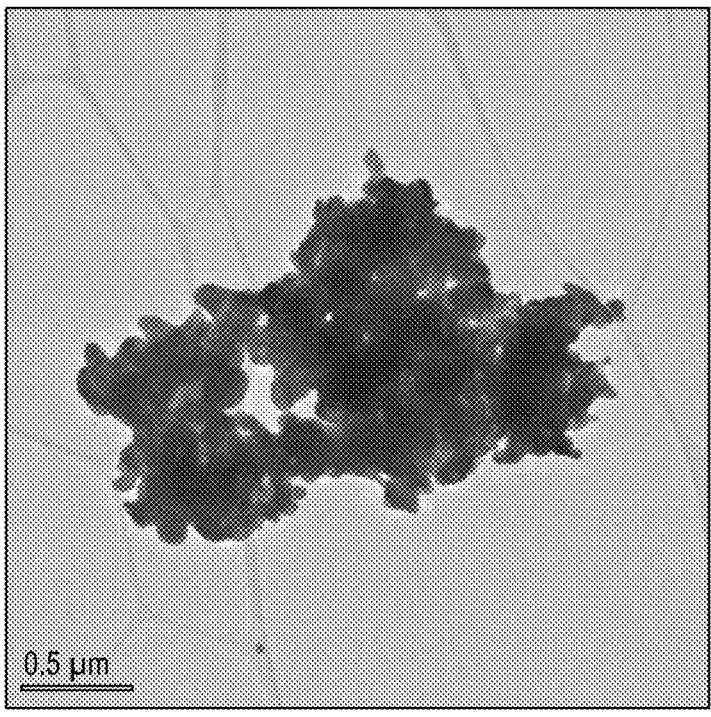
FIG. 4 shows an illustrative SEM image of an agglomerate of copper nanoparticles.
Figure 5:
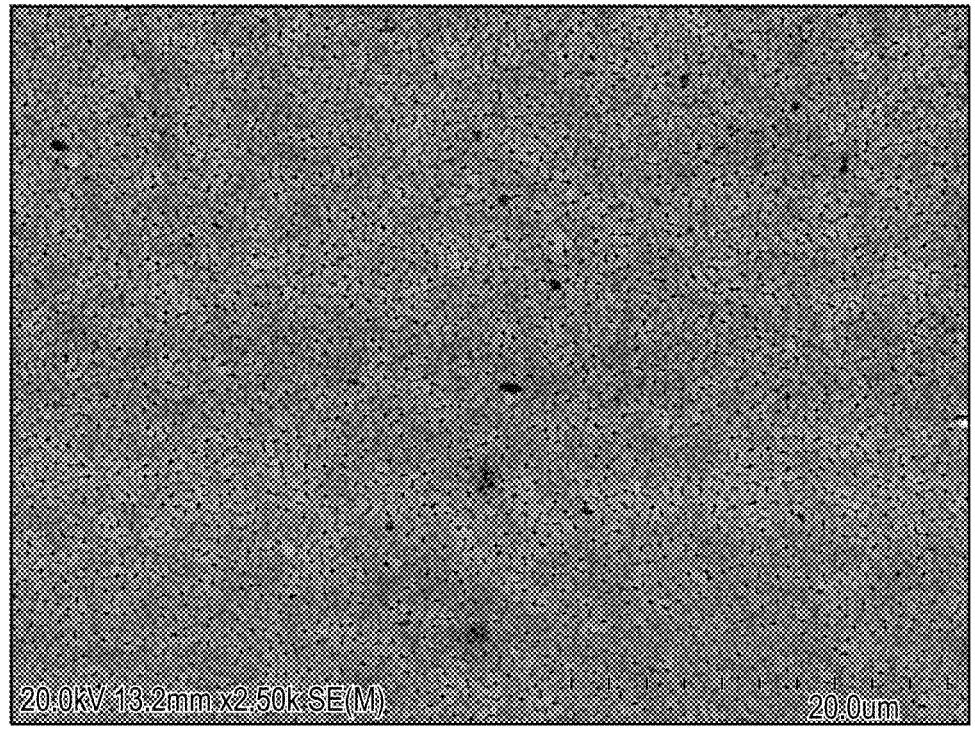
FIG. 5 shows an illustrative SEM image of a copper nanoparticle network obtained after fusion of a plurality of copper nanoparticles to each other.
Figure 6A:
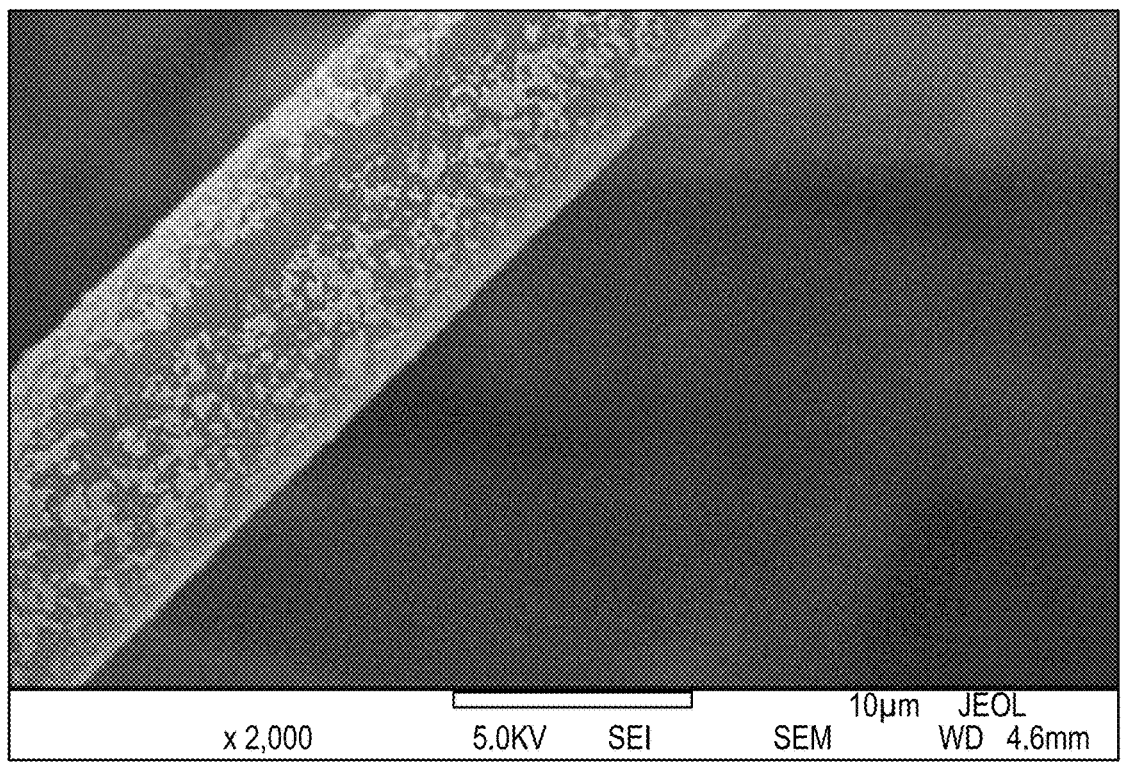
FIGS. 6A and 6B show illustrative SEM images of agglomerates of copper nanoparticles disposed upon fibers.
Figure 6B:
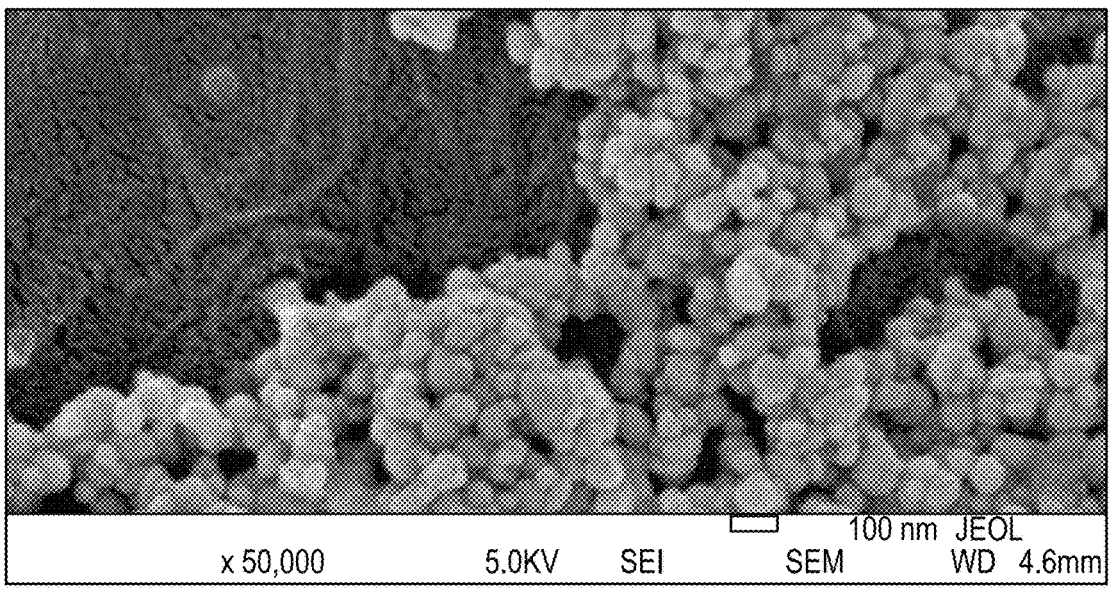

FIGS. 1 and 2 show diagrams of presumed structures of metal nanoparticles having a surfactant coating thereon. As shown in FIG. 1, metal nanoparticle 10 includes metallic core 12 and surfactant layer 14 overcoating metallic core 12. Surfactant layer 14 can contain any combination of surfactants, as described in more detail below. Metal nanoparticle 20, shown in FIG. 2, is similar to that depicted in FIG. 1, except metallic core 12 is grown about nucleus 21. Because nucleus 21 is buried deep within metallic core 12 in metal nanoparticle 20 and is very small in size, it is not believed to significantly affect the overall nanoparticle properties. Nucleus 21 may comprise a salt or a metal, wherein the metal may be the same as or different than that of metallic core 12. In some embodiments, the nanoparticles can have an amorphous morphology. FIGS. 1 and 2 may be representative of the microscopic structure of copper or silver nanoparticles suitable for use in the disclosure herein. FIG. 3 shows an illustrative SEM image of substantially individual copper nanoparticles. FIG. 4 shows an illustrative SEM image of an agglomerate of copper nanoparticles, which may be used in the disclosure herein. FIG. 5 shows an illustrative SEM image of a copper nanoparticle network obtained after fusion of a plurality of copper nanoparticles to each other. FIGS. 6A and 6B show illustrative SEM images of agglomerates of copper nanoparticles adhered to textile fibers. The agglomerates of copper nanoparticles are robustly adhered to the textile fibers but do not undergo fusion with one another. The bonding to textile fibers may be representative of the bonding of metal nanoparticle agglomerates to a surface of an article in accordance with the present disclosure.

Figure 7:
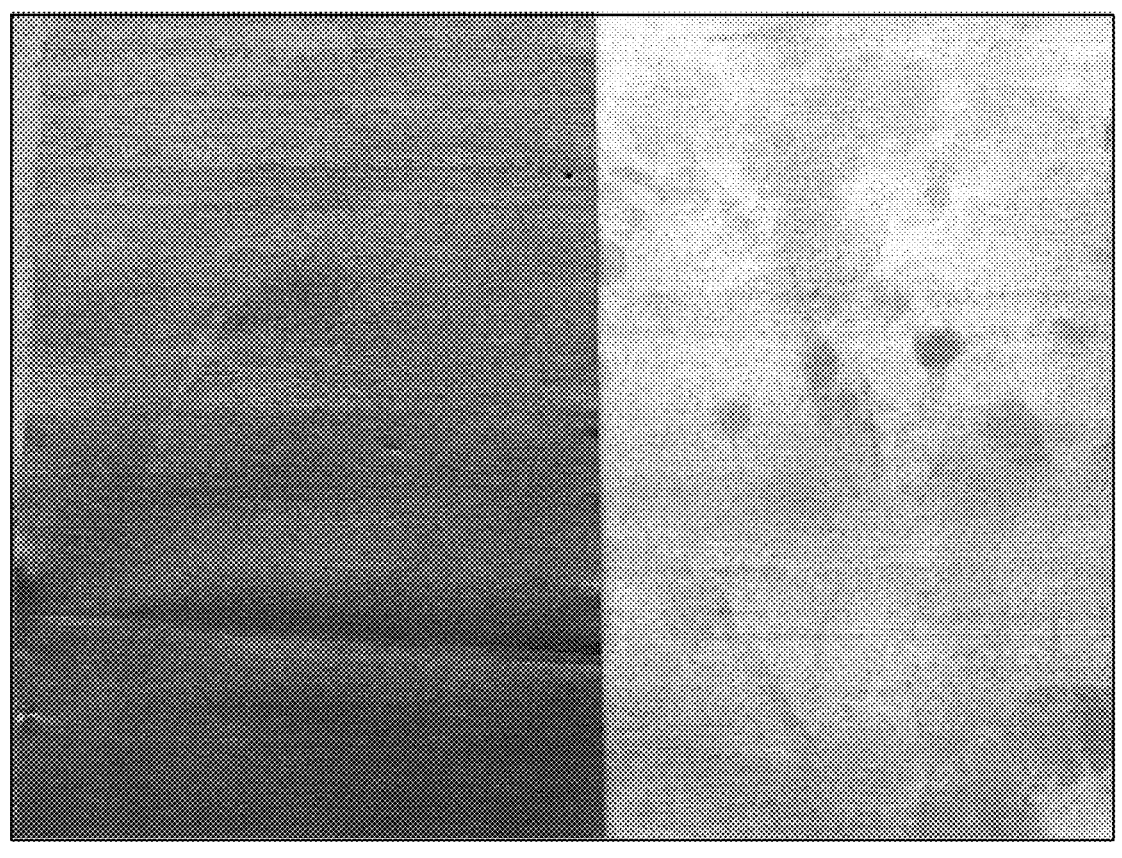
FIG. 7 shows an illustrative photographic image of a fabric having agglomerates of copper nanoparticles adhered thereto, as fabricated (left side of image) and after extended use (right side of image).

Advantageously, metal nanoparticle agglomerates may provide an indication of when their biocidal activity is waning. FIG. 7 shows an illustrative photographic image of a fabric having agglomerates of copper nanoparticles adhered thereto, as fabricated (left side of image) and after extended use (right side of image). Provided there is sufficient visual contrast with the surface they are deposited upon, a lightening in color or contrast may be indicative that metal nanoparticles are becoming increasingly oxidized to form metal salts, and biocidal activity may be waning.

As discussed above, the metal nanoparticles have a surfactant coating containing one or more surfactants upon their surface. The surfactant coating can be formed on the metal nanoparticles during their synthesis. Formation of a surfactant coating upon metal nanoparticles during their syntheses can desirably limit the ability of the metal nanoparticles to fuse to one another prematurely, limit agglomeration of the metal nanoparticles to a desired extent or agglomerate size, and promote the formation of a population of metal nanoparticles having a narrow size distribution. At least partial loss of the surfactant coating may occur upon heating the metal nanoparticles up to the fusion temperature, including at least some surfactant loss well below the fusion temperature for low-boiling surfactants. Surfactant loss may be further promoted by flowing gas and/or application of vacuum (reduced pressure), as desired, even below the fusion temperature. At least some surfactant loss may occur at room temperature and ambient pressure conditions in some instances when the metal nanoparticles are deposited upon a surface. Following surfactant loss, fusion of the metal nanoparticles may take place at or above the fusion temperature. If the uncoated metal nanoparticles are not heated above the fusion temperature and remain unfused, uncoated metal nanoparticle having a high surface energy may remain within the metal nanoparticle agglomerates upon the surface of an article. Surface oxidation of the metal nanoparticles may take place in these circumstances and others. The high surface energy may promote adherence of the metal nanoparticle agglomerates to the surface and provide a highly reactive metal form for rendering a surface biocidal. The metal nanoparticles may become adhered to a surface of an article even below the fusion temperature once the surfactant coating has been removed. When heated above the fusion temperature, nanoparticle fusion may take place in combination with the metal nanoparticles becoming adhered to the surface.

Various types of metal nanoparticles may be synthesized by metal reduction in the presence of one or more suitable surfactants, such as copper nanoparticles or silver nanoparticles. Copper and/or silver can be particularly desirable metals for use in the embodiments of the present disclosure due to their ability to promote killing or inactivation of bacteria upon a surface, thereby inhibiting biofilm formation or promoting inactivation or killing of one or more microorganisms. Significantly higher biocidal activity for both of these metals may be realized when utilizing metal nanoparticles compared to the biocidal activity obtained for a bulk metal surface. Copper may also be particularly advantageous due to its low cost. Zinc can similarly display biocidal activity against bacteria and may be substituted for copper or silver in any of the embodiments disclosed herein. Zinc may also be used in combination with copper and/or silver as well. NiO and $TiO_2$ may be used similarly in this respect. Nanoparticle forms of Zn, Ni, Co, and Ti may be utilized as well, either alone or in combination with copper nanoparticles and/or silver nanoparticles or at least partially oxidized variants thereof. $Cu_2O$ may be present in at least some embodiments. Cobalt compounds, such as cobalt salts, may be present in combination with metal nanoparticle agglomerates as well.

In various embodiments, the surfactant system present within the metal nanoparticles can include one or more surfactants. The differing properties of various surfactants can be used to tailor the properties of the metal nanoparticles. Factors that can be taken into account when selecting a surfactant or combination of surfactants for inclusion upon the metal nanoparticles can include, for example, ease of surfactant dissipation from the metal nanoparticles during or prior to metal nanoparticle fusion, nucleation and growth rates of the metal nanoparticles to impact the metal nanoparticle size, the metal component of the metal nanoparticles, the propensity of a given surfactant to encourage or discourage agglomeration, and the like. Main group metals, for example, may require different surfactants than do transition metals when forming metal nanoparticles.

In some embodiments, an amine surfactant or combination of amine surfactants, particularly aliphatic amines, can be present upon the metal nanoparticles. Amine surfactants can be particularly desirable for use in conjunction with copper nanoparticles or silver nanoparticles due to their good affinity for these transition metals. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. This combination of surfactants may be particularly effective for producing metal nanoparticles within a desired size range. Further disclosure regarding suitable amine surfactants follows hereinafter.

In some embodiments, the surfactant system can include a primary alkylamine. In some embodiments, the primary alkylamine can be a $C_2$-$C_{18}$ alkylamine. In some embodiments, the primary alkylamine can be a $C_7$-$C_{10}$ alkylamine. In other embodiments, a $C_5$-$C_6$ primary alkylamine can also be used. Without being bound by any theory or mechanism, the exact size of the primary alkylamine can be balanced between being long enough to provide an effective inverse micelle structure during synthesis versus having ready volatility and/or ease of handling during nanoparticle consolidation. For example, primary alkylamines with more than 18 carbons can also be suitable for use in the present embodiments, but they can be more difficult to handle because of their waxy character. $C_7$-$C_{10}$ primary alkylamines, in particular, can represent a good balance of desired properties for ease of use.

In some embodiments, the $C_2$-$C_{18}$ primary alkylamine can be n-hexylamine, n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the metal coordination sphere but be readily dissociable therefrom during metal nanoparticle consolidation.

In some embodiments, the surfactant system can include a secondary amine. Secondary amines suitable for forming metal nanoparticles can include normal, branched, or cyclic $C_4$-$C_{12}$ alkyl groups bound to the amine nitrogen atom. In some embodiments, the branching can occur on a carbon atom bound to the amine nitrogen atom, thereby producing significant steric encumbrance at the nitrogen atom. Suitable secondary amines can include, without limitation, dihexylamine, diisobutylamine, di-t-butylamine, dineopentylamine, di-t-pentylamine, dicyclopentylamine, dicyclohexylamine, and the like. Secondary amines outside the $C_4$-$C_{12}$ range can also be used, but such secondary amines can have undesirable physical properties such as low boiling points or waxy consistencies that can complicate their handling.

In some embodiments, the surfactant system can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present.

In some embodiments, the alkyl groups can be $C_1$-$C_6$ alkyl groups. In other embodiments, the alkyl groups can be $C_1$-$C_4$ alkyl groups or $C_3$-$C_6$ alkyl groups. In some embodiments, $C_3$ or higher alkyl groups can be straight or have branched chains. In some embodiments, $C_3$ or higher alkyl groups can be cyclic. Without being bound by any theory or mechanism, it is believed that diamine chelating agents can facilitate metal nanoparticle formation by promoting nanoparticle nucleation.

In some embodiments, suitable diamine chelating agents can include N,N'-dialkylethylenediamines, particularly $C_1$-$C_4$ N,N'-dialkylethylenediamines. The corresponding methylenediamine, propylenediamine, butylenediamine, pentylenediamine or hexylenediamine derivatives can also be used. The alkyl groups can be the same or different. $C_1$-$C_4$ alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for inclusion upon metal nanoparticles include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly $C_1$-$C_4$ N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in forming metal nanoparticles include, for example, N,N,N',N'-tetramethylethylenediamine, N,N,N',N'-tetraethylethylenediamine, and the like.

Surfactants other than aliphatic amines can also be present in the surfactant system. In this regard, suitable surfactants can include, for example, pyridines, aromatic amines, phosphines, thiols, or any combination thereof. These surfactants can be used in combination with an aliphatic amine, including those described above, or they can be used in a surfactant system in which an aliphatic amine is not present. Further disclosure regarding suitable pyridines, aromatic amines, phosphines, and thiols follows below.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in forming metal nanoparticles include, for example, aniline, toluidine, anisidine, N,N-dimethylaniline, N,N-diethylaniline, and the like. Other aromatic amines that can be used in conjunction with metal nanoparticles can be envisioned by one having ordinary skill in the art.

Suitable pyridines can include both pyridine and its derivatives. Illustrative pyridines that can be suitable for inclusion upon metal nanoparticles include, for example, pyridine, 2-methylpyridine, 2,6-dimethylpyridine, collidine, pyridazine, and the like. Chelating pyridines such as bipyridyl chelating agents may also be used. Other pyridines that can be used in conjunction with metal nanoparticles can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be present upon metal nanoparticles include, for example, trimethylphosphine, triethylphosphine, tributylphosphine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with metal nanoparticles can be envisioned by one having ordinary skill in the art.

Suitable thiols can have a formula of RSH, where R is an alkyl or aryl group having from about 4 to about 16 carbon atoms. Illustrative thiols that can be present upon metal nanoparticles include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with metal nanoparticles can be envisioned by one having ordinary skill in the art.

As mentioned above, a distinguishing feature of metal nanoparticles is their high surface energy, particularly after removal of a surfactant coating therefrom, which may promote adherence to the surface of an article in a form suitable for providing a highly active metal species upon the surface. A surfactant associated with the metal nanoparticles may further facilitate surface adhesion thereof, especially prior to surfactant loss and formation of uncoated metal nanoparticles having a high surface energy. That is, the surfactant coating may initially hold metal nanoparticle agglomerates in place (e.g., through van der Waals forces) until a high surface energy state has been attained to promote more robust adherence and retention of the metal nanoparticles upon a surface. Robust adherence to a surface may still be realized even with the surfactant coating intact, however, particularly when an adhesive is used. In some cases, a surfactant coating may be sufficient to hold metal nanoparticle agglomerates in place upon a surface until an adhesive has been applied thereto.

The loading of metal nanoparticles as metal nanoparticle agglomerates upon the surface of an article in need of protection against biofilm formation or otherwise in need of having biocidal activity conveyed thereto may include a coverage density ranging from about 0.1 mg/in$^2$ to about 10 mg/in$^2$, or about 0.5 mg/in$^2$ to about 5 mg/in$^2$, or about 1 mg/in$^2$ to about 2 mg/in$^2$ or about 0.5 mg/in$^2$ to about 3 mg/in$^2$, or about 1 mg/in$^2$ to about 5 mg/in$^2$. The coverage of metal nanoparticles as metal nanoparticle agglomerates upon the surface may range from about 5% to about 95% by area, or about 50% to about 99% by area, or about 60% to 95% by area. Even coverage densities as low as 3-5% by area may be effective for inhibiting biofilm formation and conveying biocidal activity in the disclosure herein. The metal nanoparticle agglomerates may be dispersed in a polymer when disposed upon an article's surface in some instances.

As-produced metal nanoparticles are usually produced in the form of agglomerates, which are then broken apart into individual surfactant-coated metal nanoparticles in order to promote use in various applications. Surprisingly, in the disclosure herein, the as-produced agglomerates, such as those residing in a 0.1-35 micron size range, particularly a 0.1-15 micron size range or a 0.1-5 micron size range, may facilitate ready dispensation and adherence upon a surface and convey biocidal activity thereto. Even larger metal nanoparticle agglomerates, up to about 100 microns in size, may be applicable in some instances and effective for dispensation upon a surface in various manners. Such agglomerates may change their shape as they adhere to a surface, while remaining bound to each other in a "colony." Within the metal nanoparticle agglomerates, recognizable sub-structures may be present prior to nanoparticle fusion such as, but not limited to, 10-50 nm thick platelets having a width of about 100-250 nm, 1-5 nm thick platelets having a width of about 30-50 nm, 100-250 nm wide spheres, metal nanowires, the like, or any combination thereof. The sub-structures may have any shape such as square, triangular, rectangular, multi-faceted, round, and ovular, and crystalline, and/or non-crystalline morphologies. Elongate structures, such as metal nanowires, may have an aspect ratio of at least about 10 or at least about 25, for example. Copper nanoparticles and/or silver nanoparticles may also be combined with pre-made nanowires (e.g., copper nanowires or silver nanowires) and deposited upon a surface as well. Oxide forms of copper or silver, such as $Cu_2O$, may also be present after deposition upon a surface subject to biofilm formation or microorganism contamination. Zinc, nickel, titanium, or cobalt, particularly in the form of nanoparticles or a salt form or a metal oxide form thereof, may be present in any of these embodiments as well.

When present at the foregoing coverages and coverage densities upon the surface of an article, the metal nanoparticle agglomerates may effectively inactivate bacteria or viruses, oftentimes more effectively than does a bulk metal surface comprising the same metal. The inactivation of bacteria and viruses may inhibit biofilm formation and/or preclude disease transmission from the surface of an article. For example, copper nanoparticles adhered to a surface within metal nanoparticle agglomerates and retaining their nanoparticulate form may afford inactivation of microorganisms within as little as 5 minutes, sometimes as little as 30 seconds, or even as little as 5-10 seconds. Up to 100% kill rates or inactivation rates may be realized. Bulk copper surfaces, in contrast, may take several hours to reach the same level of inactivation. Without being bound by theory or mechanism, killing or inactivation of bacteria or viruses may occur through copper overload and non-specific damage to envelope phospholipids, envelope or intracellular proteins, and/or nucleic acids.

Articles and locations that are inhibited against biofilm formation in accordance with the disclosure herein may similarly have biocidal activity conveyed thereto, such as to limit transmission of viable microorganisms from a touch surface. Articles and locations that are not prone to biofilm formation, including those not in at least occasional contact with a fluid, may similarly have biocidal activity conveyed thereto by a coating comprising metal nanoparticles or metal nanoparticle agglomerates adhered to at least a portion of the surface of the article, preferably via an adhesive. Accordingly, any article that may be rendered resistant to biofilm formation according to the disclosure herein may concurrently be rendered biocidal through incorporation of metal nanoparticles thereon, and vice versa.

The article having an at least partial metal nanoparticle agglomerate coating thereon may have a surface comprising a material selected from a polymer, a metal, glass, a ceramic, a textile or any combination thereof. Polymer surfaces, in particular, may have the metal nanoparticle agglomerates at least partially embedded therein if the surface is processed above the softening temperature of the polymer following deposition of metal nanoparticle agglomerates thereon. Crosslinked polymers may similarly have metal nanoparticle agglomerates embedded in the surface (as well as dispersed throughout the crosslinked polymer) if crosslinking takes place in the presence of the metal nanoparticle agglomerates, preferably below the fusion temperature. In still another example, metal nanoparticle agglomerates may be "baked in" to the surface of a metal in some instances.

The metal nanoparticles may comprise copper nanoparticles, silver nanoparticles, or any combination thereof. Copper nanoparticles in an amount effective to limit biofilm growth or proliferation or to promote biocidal activity may include a coverage of about 60% to about 95% of a specified portion of a surface by area and a coverage density of about 1 mg/in$^2$ to about 10 mg/in$^2$ or about 1 mg/in$^2$ to about 5 mg/in$^2$. At least partial oxidation to $Cu_2O$ may be particularly effective in this regard. Without being bound by any theory or mechanism, it is believed that Cu(0) may be oxidized to Cu(I) on the surface in a slow process, with further oxidation to Cu(II) taking place rapidly thereafter. When the metal nanoparticle agglomerates contact microorganisms, hydroxyl radicals and lipid radicals may form, which may disrupt the outer lipid bilayer or protein shell of a virus or bacterium. In addition, copper may bind to heteroatoms (e.g., S, N or P) within amino acids, proteins, DNA and/or RNA of microorganisms to result in inactivation or killing thereof. Metal penetration within a cell membrane or protein coat may also occur, wherein the metal may inhibit DNA/RNA replication and/or inhibit protein transport.

Combinations of copper nanoparticles and silver nanoparticles may afford particular synergy against biofilms and their associated bacteria that are not remediated adequately with a single metal alone. That is, copper nanoparticles and silver nanoparticles may convey biocidal activity against different pathogens, both for inhibiting biofilm formation and for rendering a surface biocidal to limit transmission of viable microorganisms. In addition, enhanced activity against a particular type of bacteria may be realized when both copper nanoparticles and silver nanoparticles are present in the form of metal nanoparticle agglomerates, as compared to copper nanoparticles or silver nanoparticles alone. Without being bound by theory or mechanism, two different types of metal nanoparticles may target different biological pathways and receptors within a given type of bacteria, thereby affording more effective killing or inactivation than is possible with either type of metal nanoparticle alone. The ability to target multiple biological pathways may be particularly advantageous when inhibiting biofilm formation due to the potential exchange of genetic information amongst different bacterial species. In addition to copper and/or silver nanoparticles or oxidized forms of these metals, Ni, Ti, Co, or Zn nanoparticles, or oxide forms of these metals may be present within a surface coating as well. Conventional biocidal agents, including antibiotic substances, may be present as well.

Metal nanoparticle agglomerates may be disposed upon the surface of an article from solutions or suspensions thereof, which may be formulated with further additives to make the liquid form suitable for dispensation by a given application technique. Particularly suitable liquid forms of coating formulations may be dispensed by spraying, printing, dip coating, pouring, painting, or the like. The metal nanoparticles within the metal nanoparticle agglomerates may be adhered to the surface after being deposited thereon or may become adhered at a later time. The metal nanoparticles may remain as individual metal nanoparticles within the metal nanoparticle agglomerates after being adhered to the surface or may become at least partially fused to one another. More desirably, the metal nanoparticles may remain unfused within the metal nanoparticle agglomerates, wherein the metal nanoparticle agglomerates are adhered to the surface of the article, with adherence optionally being further promoted with an adhesive.

A polymer may be present in combination with metal nanoparticle agglomerates in a liquid formulation used to deposit the metal nanoparticle agglomerates upon the surface. Any polymer that may be dissolved in the liquid formulation and that may satisfactorily disperse metal nanoparticle agglomerates in the liquid formulation and once deposited upon a surface may be utilized. For coatings formed on medical devices and similar articles, suitable polymers may include Class VI-approved polymers like PTFE, FEP, PFA, TPE, PVDF, PEEK, LCP, ETFE, THV, polyimides, polyether block amides (e.g., PEBAX®), and nylon polyamides of various types. Dissolvable or degradable polymers such as polyvinyl alcohol, polylactic acid, polyglycolic acid, or the like may be used to form a temporary coating containing metal nanoparticle agglomerates upon the surface of an article. Alternately, articles may be produced directly from blends of any of these polymers and metal nanoparticle agglomerates via a suitable forming technique (e.g., extrusion or electrospinning) to provide metal nanoparticle agglomerates upon the surface of the article. At least partially degradable or dissolvable articles containing metal nanoparticle agglomerates may be formed, such as degradable stents and sutures, for example.

An adhesive may bind the metal nanoparticle agglomerates in place to further decrease potential toxicity effects. Preferably, an adhesive is present to afford robust adherence of the metal nanoparticle agglomerates to a surface and facilitate time-release of individual metal nanoparticles or other active metal species therefrom. More preferably, the adhesive may be a biologically compatible adhesive, which may be desirable in some instances, especially for articles destined for in vivo implantation or contact with a person's skin. The adhesive may be present upon the surface of an article being coated with the metal nanoparticles, or the adhesive may be included within a coating formulation containing the metal nanoparticle agglomerates as they are applied to the surface. As still another option, an adhesive may be applied to the surface of an article after metal nanoparticle agglomerates have been deposited thereon.

Suitable adhesives may include contact and non-contact adhesives. Suitable adhesives will be familiar to one having ordinary skill in the art and include conventional epoxy adhesives, nitrile rubber adhesives, acrylic adhesives, cyanoacrylate adhesives, and the like. Particularly suitable adhesive may be biologically compatible adhesives such as octyl cyanoacrylate, 2-octyl cyanoacrylate, butyl cyanoacrylate, and isobutyl cyanoacrylate. Other examples of suitable adhesives having biocompatibility include, for example, polydioxanone, polyglycolic acid, polylactic acid, and polyglyconate. MAXON, a polyglycolide-trimethylene carbonate used a biodegradable suture adhesive, may represent a particular example. The adhesive may be present at a loading of about 0.05 mg/in$^2$ to about 0.5 mg/in$^2$ or about 0.1 mg/in$^2$ to about 0.5 mg/in$^2$ upon the surface of an article. Suitable loadings of the adhesive in a coating formulation being applied to the surface of an article may include about 0.15 g adhesive/100 g formulation to about 2.75 g adhesive/100 g formulation, or about 0.35 g adhesive/100 g formulation to about 2.75 g adhesive/100 g formulation. Coverage of the adhesive upon an article's surface may range from about 50% to about 100% by area, or about 60% to about 90% by area, or about 75% to about 95% by area, or about 90% to about 99% by area. A layer thickness of the adhesive upon the surface may be about 300 nm or less, or about 100 nm or less, or about 50 nm or less, such as about 1 nm to about 2 nm, or about 2 nm to about 5 nm, or about 5 nm to about 10 nm, or about 10 nm to about 50 nm, or about 10 nm to about 300 nm. Coatings containing a polymer may be considerably thicker than these values. In addition to promoting surface adherence, the adhesive may slow down the production of oxidized metal species, thereby affording further tailoring of the time-release profile of individual or small agglomerates of metal nanoparticles or various oxidized forms thereof from the metal nanoparticle agglomerate.

Spray formulations suitable for dispensation of metal nanoparticle agglomerates by pumping or forced pressurization with a gas may exhibit a viscosity value of about 1 cP to about 500 cP, including about 1 cP to about 100 cP. Low viscosity values such as these may facilitate dispensation through spraying promoted by mechanical pumping or forced pressurization. Metal nanoparticle agglomerate loadings within the spray formulations to produce the foregoing viscosity values may range from 1 wt. % to about 60 wt. %, or about 5 wt. % to about 55 wt. %, or about 10 wt. % to about 45 wt. %, or about 0.5 wt. % to 10 wt. %, or about 10 wt. % to about 35 wt. % about 1 wt. % to about 35 wt. %, or about 5 wt. % to about 35 wt. %, or about 10 wt. % to about 25 wt. %, or about 0.5 wt. % to 5 wt. %, or about 10 wt. % to about 15 wt. %. Similar loadings of metal nanoparticle agglomerates may be present within formulations adapted to coat metal nanoparticles upon the surface of an article by alternative techniques, such as by dip coating, painting, or the like. Spray formulations configured to be deposited through use of an aerosol propellant may likewise have a similar loading of metal nanoparticle agglomerates as well.

Spray formulations comprising an aerosol propellant may be suitable for applying metal nanoparticle agglomerates upon the surface of an article according to the disclosure herein. Such spray formulations may similarly comprise metal nanoparticle agglomerates dispersed in a fluid medium comprising at least an aerosol propellant and optionally other solvents to promote metal nanoparticle dispersion therein. Aerosol spray formulations may constitute a particularly desirable form for dispensing the metal nanoparticle agglomerates, since aerosol spray cans are in wide use and are easily manufactured and shipped. Aerosol propellants may afford sprayed droplets ranging from about 10-150 microns in size, whereas mechanically pumped or forced pressurization sprays may have a larger droplet size in a range of about 150-400 microns.

Any conventional aerosol propellant may be utilized in a spray formulation, provided that the metal nanoparticle agglomerates can be effectively dispersed therein, optionally in combination with one or more additional solvents, and ejected from a spray can. Organic and/or inorganic aerosol propellants may be used. Suitable inorganic aerosol propellants may include, for example, nitrous oxide or carbon dioxide. Suitable organic aerosol propellants may include, for example, volatile hydrocarbons (e.g., ethane, propane, butane, or isobutane), dimethyl ether, ethyl methyl ether, hydrofluorocarbons, hydrofluoroolefins, or any combination thereof. Chlorofluorocarbons and similar compounds may also be used as an aerosol propellant, but their use is not preferred due to their ozone-depleting properties. Nevertheless, chlorofluorocarbons may be satisfactory alternatives in situations where other organic aerosolizable fluid media may not be effectively used.

When using an aerosol propellant to promote dispensation of metal nanoparticle agglomerates, the metal nanoparticle agglomerates may be directly combined therewith, or the metal nanoparticles may be dissolved in a secondary fluid medium that is subsequently combined with the aerosol propellant in a spray can or similar container. Suitable secondary fluid media may comprise organic solvents such as alcohols, glycols, ethers, or the like. Any of the organic solvents utilized herein in mechanically pumped or forced pressurization spray formulations may be incorporated in spray formulations containing an aerosol propellant as a secondary fluid medium as well.

Spray formulations comprising an organic solvent may comprise a mixture of organic solvents that evaporates in a specified period of time, typically under ambient conditions. In non-limiting examples, evaporation may take place in about 1 minute or less, or about 2 minutes or less, or about 5 minutes or less, or about 10 minutes or less, or about 15 minutes or less, or about 30 minutes or less. To facilitate evaporation, the metal nanoparticle agglomerates may be dispersed as a concentrate in a higher boiling organic solvent, such as a $C_{10}$ alcohol, which is then combined with a much larger quantity of low boiling organic solvent, such as ethanol or diethyl ether, optionally in further combination with additional organic solvents. The high boiling organic solvent may be sufficiently hydrophobic to facilitate dispersion of the metal nanoparticles in the less hydrophobic and lower boiling organic solvent comprising the majority of the organic phase.

Spray formulations suitable for dispensation using a pump may be prepared by dispersing as-produced or as-isolated metal nanoparticles in an organic medium comprising one or more organic solvents. Optionally, one or more inorganic components may be present as well, particularly water. Particularly suitable organic solvents that may be used in a spray formulation include a $C_1$-$C_{11}$ alcohol, or multiple $C_1$-$C_{11}$ alcohols in any combination. $C_1$-$C_4$ alcohols may be particularly desirable due to their lower boiling points, which may facilitate solvent removal from a surface undergoing disinfection. Additional alcohol-miscible organic solvents may also be present. Ketone and aldehyde organic solvents in the $C_2$-$C_{11}$ size range may also be used, either alone or in combination with one or more alcohols. Ketone and aldehyde solvents are less polar than are alcohols and may aid in metal nanoparticle dispersion. Low boiling ethers such as diethyl ether, dipropyl ether, and diisopropyl ether, for example, may also be suitably used to promote metal nanoparticle dispersion. One or more glycol ethers (e.g., diethylene glycol, triethylene glycol, or the like), alkanolamines (e.g., ethanolamine, triethanolamine, or the like), or any combination thereof may also be used alone or in combination with one or more alcohols or any of the other foregoing organic solvents. Various glymes may also be used similarly. Water-miscible organic solvents and mixtures of water and water-miscible organic solvents may be used as well, such as water-organic solvent mixtures comprising up to about 50% water by volume or up to about 75% water by volume.

In various embodiments, individual metal nanoparticles within the metal nanoparticle agglomerates disposed upon a surface may be about 20 nm or more in size, particularly wherein at least a majority of the metal nanoparticle within metal nanoparticle agglomerates are about 50 nm or more size, or about 75 nm or more in size, or about 100 nm or more in size. For example, at least about 90%, at least about 95%, or at least about 99% of the metal nanoparticles may be about 25 nm to about 200 nm in size, or about 50 nm to about 250 nm in size, or about 20 nm to about 250 nm in size in the disclosure herein. Smaller metal nanoparticles (under 50 nm, particularly those under 20 nm) may tend to undergo more extensive oxidation and lose their biocidal activity more quickly than do larger metal nanoparticles. By using larger metal nanoparticles within metal nanoparticle agglomerates, the rate of oxidation may be more easily regulated upon a surface in need of having biocidal activity conveyed thereto. For example, smaller copper nanoparticles may tend to undergo more extensive oxidation into CuO or $Cu_2O$ than do larger copper nanoparticles having a size above about 20 nm or above about 50 nm, thereby rendering the copper nanoparticles less active toward promoting biocidal activity. Copper nanoparticles in the foregoing size range (20 nm or above or 50 nm or above) may afford a coating comprising a mixture of CuO and $Cu_2O$ upon a metallic copper metal core, the combination of which may be advantageous for inactivating bacteria or viruses and preventing or limiting biofilm formation according to the disclosure herein. Silver nanoparticles in a similar size range may form a coating comprising silver oxide upon a metallic silver core. When copper nanoparticles and/or silver nanoparticles are agglomerated together upon a surface and are adhered thereto, the oxide coating may extend over at least a portion of the surface of individual metal nanoparticles within the agglomerate, leaving an exposed copper or silver metal surface below within the porosity of the agglomerate. By having larger metal nanoparticles in the foregoing size range, a substantial amount of zero-valent metal may be retained for promoting biocidal activity, whereas smaller metal nanoparticles may form too much oxide to promote optimal bioactivity.

Metal nanoparticles, such as copper nanoparticles, that are about 20 nm or less in size can also be used in the disclosure herein, either alone or in combination with a plurality of metal nanoparticles in which a majority of the metal nanoparticles are about 50 nm or larger in size and present in metal nanoparticle agglomerates. Copper nanoparticles in this size range (20 nm or less in size) have a fusion temperature of about 220° C. or below (e.g., a fusion temperature in the range of about 140° C. to about 220° C.) or about 200° C. or below, or even about 175° C. or below, which can provide advantages noted above. Silver nanoparticles about 20 nm or less in size may also be used in the disclosure herein and similarly exhibit a fusion temperature differing significantly from that of the corresponding bulk metal. Larger metal nanoparticles (either copper or silver nanoparticles), in turn, have a higher fusion temperature, which may rapidly increase and approach that of bulk metal as the nanoparticle size continues to increase. Even these larger metal nanoparticles may become adhered to the surface of an article once their surfactant coating has been lost or bonding takes place via an adhesive. Optionally, bonding of the larger metal nanoparticles to the surface may take place by way of smaller metal nanoparticles may that have undergone fusion while contacting the larger metal nanoparticles within the metal nanoparticle agglomerates. Depending on the processing temperature and the fusion temperature of the metal nanoparticles based upon their size, the metal nanoparticles may or may not be fused to one another when deposited upon a surface in the disclosure herein. Regardless of whether the metal nanoparticles become fused or not once deposited upon a surface, after the surfactant coating is removed, the metal nanoparticles may experience robust adherence to the surface, preferably through an adhesive, and become effective for conveying biocidal activity against microorganisms once shed from the metal nanoparticle agglomerates in an active metal form.

In addition to copper nanoparticles, silver nanoparticles, or alternative nanostructures containing these metals, other additives may be introduced upon a surface to aid in limiting the formation of biofilms or promoting microorganism inactivation according to the disclosure herein. Suitable additives may include, but are not limited to, those capable of producing reactive oxygen species (ROS), which may cause lipid, protein, or DNA damage in microorganisms, eventually leading to cell membrane damage and cell death. These additives may complement or enhance the biocidal activity conveyed by metal nanoparticle agglomerates containing copper nanoparticles, silver nanoparticles, or alternative metal nanoparticles having biocidal activity, such as those comprising zinc. Conventional disinfectant compounds may be present in liquid formulations for forming a nanoparticle coating upon the surface of an article as well, provided that they are compatible with a given use indication of the articles. For example, disinfectants may not be suitable for use when forming a surface coating upon an article destined for implantation in vivo.

NiO may be included as an additive upon the surface of an article in addition to metal nanoparticle agglomerates. NiO is very efficient in producing ROS when present in small concentrations. NiO may be effective when included at, for example, about 0.5% to about 10% of the load of copper nanoparticles and/or silver nanoparticles upon the surface of an article (e.g., 0.5 mg to 100 mg NiO) as sub-micron particles separate and distinct from the copper nanoparticles and/or silver nanoparticles. At these loadings, NiO is very effective against certain bacteria, which may broaden the biocidal effectiveness of copper or silver. Bismuth, zinc, and tin oxides may be similarly effective at loadings of about 0.5% to about 10% of the mass of copper nanoparticles.

$TiO_2$ may be included as an additive upon the surface of an article in addition to metal nanoparticles. $TiO_2$ may catalyze the formation of hydroxyl radicals upon UV irradiation (e.g., in sunlight) when an article is located outdoors, for example. Atmospheric moisture or water in contact with the article may supply the source of water for producing the hydroxyl radicals by photooxidation. $TiO_2$ may be present at about 1% to about 25% of the load of copper nanoparticles and/or silver nanoparticles upon the surface of the article. The $TiO_2$ may likewise be present in the form of nanoparticles and/or micron-size particles (e.g., about 100 nm to about 5 microns).

Cobalt compounds may also be combined with metal nanoparticle agglomerates, either alone or in combination with any of the foregoing additives. More specifically, cobalt (II) salts like halide, carbonate, sulfate, oxide (CoO), and the like may be present in combination with metal nanoparticle agglomerates in the disclosure herein. Cobalt ions may present at, for example, about 0.1% to about 10% of the load of copper nanoparticles and/or silver nanoparticles as sub-micron particles separate and distinct from the copper nanoparticles and/or silver nanoparticles within metal nanoparticle agglomerates.

Copper nanoparticles and/or silver nanoparticles, including oxidized forms thereof, and NiO and/or $TiO_2$ and/or ZnO and/or cobalt compounds may also be used in any combination with one another as well. These additives may be introduced to the surface of an article at the same time as metal nanoparticles are introduced or at different times.

After depositing a coating formulation containing metal nanoparticle agglomerates upon the surface of an article subject to biofilm formation or otherwise in need of having biocidal activity conveyed thereto, removal of the solvent and optionally the surfactants may take place. Although solvents and surfactants may be removed under ambient conditions (room temperature and atmospheric pressure), application of at least one of heating, gas flow, and/or vacuum (reduced pressure) may accelerate removal of the solvent and surfactants from the surface, thereby leading to the metal nanoparticle agglomerates becoming adhered to the surface of the article. Heating may take place at any temperature up to or beyond the fusion temperature of the metal nanoparticles, provided that the heating temperature is not so high that the article itself experiences thermal damage. Thus, the metal nanoparticles within the metal nanoparticle agglomerates may be fused or unfused when adhered to the surface of the article. Preferably, the temperature is sufficient to promote adhesion of the metal nanoparticle agglomerates to the surface of the article, but leaving the metal nanoparticles as individuals within the metal nanoparticle agglomerates. Moreover, the heating temperature need not necessarily exceed the normal boiling point or reduced pressure boiling point of the surfactants and solvents in order to promote their removal. Gentle heating well below the boiling point of the surfactant and solvent may be sufficient to promote their removal in many instances. In non-limiting embodiments, the heating may be conducted under flowing nitrogen, air or other inert gas or under vacuum to promote surfactant or solvent removal. For example, heating the surface at a temperature of about 35° C. to about 65° C. in flowing nitrogen or air may be sufficient to remove the solvent and surfactant, thereby leaving unfused metal nanoparticles distributed upon at least a portion of the surface of an article as a plurality of metal nanoparticle agglomerates. Additional heating may be conducted thereafter, if desired, to promote at least partial metal nanoparticle fusion. In either case, after the surfactants are removed from the metal nanoparticle surface, robust adherence to the surface may be realized. When heating under higher temperatures, use of an inert atmosphere, such as nitrogen, may be desirable to limit degradation of the article or article surface and to control the amount of surface oxidation taking place upon the metal nanoparticles once the surfactant coating has been removed.

Once the surfactant coating has been removed from the metal nanoparticles, particularly copper nanoparticles and/or silver nanoparticles, the metal nanoparticles and/or agglomerates thereof may undergo at least partial oxidation. As indicated above, in the case of copper nanoparticles, the size of the copper nanoparticles and the agglomerates thereof may be selected such that at least some copper metal remains following oxidation, since a mixture of copper metal (metallic copper or zero-valent copper) and oxidized copper may be beneficial for promoting inhibition or killing of microorganisms. Silver nanoparticles may similarly experience different amounts of surface oxidation depending upon the size of the silver nanoparticles and how they are processed. In non-limiting embodiments, following surfactant removal, copper nanoparticles may form a reaction product upon a surface comprising about 25% to about 99% metallic copper by weight, about 0.5% to about 60% $Cu_2O$ by weight, and about 0.1% to about 20% CuO by weight. In more particular embodiments, the amount of metallic copper may be about 45% to about 90% by weight, or about 50% to about 70% by weight, and the amount of $Cu_2O$ may be about 10% by weight or less, such as about 0.1% to about 10% by weight or less or about 5% to about 10% by weight or less, and the amount of CuO may be about 1% by weight or less, such as about 0.1% to about 1% by weight or about 0.5% to about 1% by weight. The $Cu_2O$ and CuO may form at least a partial coating (shell) or full coating upon the metal nanoparticles or agglomerates thereof that is about 10 nm or greater in thickness, or 100 nm or greater in thickness, such as about 100 nm to about 3 microns thick in many instances.

Silver nanoparticles adhered to the surface of an article subject to biofilm formation may similarly comprise about 25% to about 99% metallic silver by weight and the balance being $Ag_2O$. The $Ag_2O$ may similarly be present in a coating (shell) having a thickness of about 10 nm or greater, such as about 100 nm to about 3 microns thick.

Accordingly, methods for inhibiting biofilm formation or rendering a surface biocidal may comprise: providing an article having a surface with a coating thereon, the coating comprising metal nanoparticle agglomerates adhered to at least a portion of the surface; and exposing the article to conditions subject to promoting biofilm formation or microorganism contamination upon the surface. The coating at least partially inhibits formation or proliferation of a biofilm upon the surface of the article and/or renders the surface biocidal and self-sterilizing in a manner that does not promote toxicity, microorganism resistance, or mutagenic effects. Alternately or additionally, the methods may comprise applying a coating formulation comprising a plurality of metal nanoparticle agglomerates upon a surface of an article; and adhering the metal nanoparticle agglomerates to the surface of the article, preferably via at least an adhesive to promote adherence.

Articles upon which metal nanoparticle agglomerates may be deposited as an at least partial coating are not believed to be particularly limited. Example articles may include those that are configured for in vivo implantation or skin contact or those configured for immersion or periodic contact with water during their operational use. Other types of articles may include those featuring high touch surfaces, from which bacteria, fungi, viruses, or other microorganisms may be transmitted to promote disease spread. Any type of article having a surface prone to biofilm formation or pathogen transmission may be modified metal nanoparticle agglomerates according to the disclosure herein.

Illustrative examples of articles configured for in vivo implantation or skin contact and that may be protected against biofilm formation according to the disclosure herein may include medical devices, prosthetics, bandages, sutures, and the like. More specific examples may include, for instance, temporary medical implants such as catheters, endotracheal tubes, nasogastric tubes, shunts, contact lenses, intrauterine devices, and the like; permanent or semi-permanent medical implants such as prosthetic joints, heart valves, stents, pacemakers, tympanostomy tubes, and the like, as well as screws, rods, pins and other connectors associated therewith; IV needles; tubing for dialysis machines or ventilators; shunts (e.g., for colostomy bags and feeding tubes); skin grafting materials; and dental materials such as adhesives/amalgams, dentures, braces, retainers, and the like. In addition, targeted introduction of metal nanoparticle agglomerates to a subject having or potentially experiencing in vivo or external biofilm formation may also afford advantages. Examples may include patients having conditions such as ulcerative colitis, lung infections, irritable bowel disease, Crohn's disease, glycocalyx of the intestines, colorectal cancer due to microbial dysbiosis, gall stones, laryngitis, urinary tract infections, cystic fibrosis; external wounds, burns or ulcers; bed sores, or the like. While inhibiting or preventing biofilm formation, metal nanoparticle agglomerates may be applied directly to a site of biofilm formation, or they may be applied upon a bandage or similar article configured to contact a site of potential biofilm formation. Examples may include wound or burn bandages, compression stockings, debriding treatments or curative implants, and the like. Fluid formulations comprising metal nanoparticle agglomerates may also be applied to a biofilm externally or in vivo to promote mitigation thereof. Other pathogenic microorganisms may be targeted internally using metal nanoparticle agglomerates in a suitable pharmaceutically acceptable form. In addition, biofilm formation in a medical setting upon surfaces such as IV poles, wheelchairs, bed railings, surgical instruments, and the like may be mitigated by applying a metal nanoparticle agglomerate coating thereto according to the disclosure herein. For example, a metal nanoparticle agglomerate coating may be applied to any of the foregoing by spray-on techniques or by painting on metal nanoparticle agglomerates contained within a suitable fluid formulation. Other types of articles or locations that may be protected with a metal nanoparticle coating according to the disclosure herein include those having a touch surface that is highly susceptible to transmission of bacteria or viruses therefrom such as, for example, hand railings, doors, doorknobs, walls, turnstiles, cabinets, cabinet pulls, gym equipment and other types of communally shared items, water fountains, airline seats, airline seat dividers and arm rests, airline tray tables, airport security bins, bus and taxicab seats, instrument panels, food preparation machinery and utensils, restaurant tables and counters, and the like.

Metal nanoparticle agglomerates may also be used to form coatings upon animal pens and enclosures to limit disease transmission, or animal feed bins may be coated with metal nanoparticle agglomerates to decrease spoilage of food. In addition, metal nanoparticle agglomerates may be included as a supplement to animal feed as well.

Additional articles in need of protection against biofilm formation and/or for limiting microorganism transmission from a touch surface may include those in industrial, residential or commercial settings that are at least partially submerged or experience periodic contact with water. Illustrative examples may include, but are not limited to, pipes; pipelines; wellbore equipment and wellbore liners; heat exchangers; duct work; papermaking equipment; industrial and potable water distribution lines and equipment; oil rigs and deep sea risers; ships; docks; piers; bridge or building piers; wastewater treatment plant components; gardening components; pools; hot tubs; spas; fountains; floors and decking; bath tubs; showers; toilets; aquariums; food processing and storage facilities and containers; kitchen and bathroom equipment such as sponges and brushes; children's toys; water heaters and other water holding tanks; showers and faucets; rain gutters; water and food storage dispensers for livestock; and the like. Wood treated with metal nanoparticle agglomerates may supplement or be used as alternative to conventional pressure-treated wood for exterior uses, such as fences, piers, and the like.

In addition, metal nanoparticle agglomerates may also be applied directly to foodstuffs to limit spoilage or may be used as part of an oil spill cleanup process to preclude use of spilled oil as a ready food source for environmental bacteria. When applied to agricultural products, such as grapes and other fruits and vegetables that spoil easily, the metal nanoparticle agglomerates may or may not be present with an adhesive, depending the desired ease of removal of the metal nanoparticle agglomerates from the foodstuff. Application of the metal nanoparticles to the fruits and vegetables may be conducted before or after harvesting. In still another example, metal nanoparticle agglomerates may be used to treat red tides and similar bacterial outbreaks.

Examples of biofilm-forming bacteria whose growth may be inhibited through the disclosure herein include many common types of bacteria, including both gram-positive and gram-negative varieties, as well as spore forms thereof. This behavior is very unusual, as many antimicrobial agents are only active against one type of bacteria but not the other. Illustrative bacteria that may be inhibited from forming biofilms and/or otherwise being transmitted in an infection cycle according to the disclosure herein include, for example, *Enterococcus faecalis, Staphylococcus aureus, Staphylococcus epidermidis, Streptococcus viridans, E. coli, Klebsiella pneumoniae, Proteus mirabilis, Pseudomonas aeruginosa, Listeria monocytogenes, Salmonella enterica,* Methicillin-resistant *Staphylococcus aureus* (MRSA), and *Acinetobacter baumannii.* Viruses and fungi that may similarly be inhibited through application of the disclosure herein are also not believed to be particularly limited.

Embodiments disclosed herein include:

A. Biofilm-resistant articles. The articles comprise: a surface subject to biofilm formation that is adapted to contact a liquid at least periodically; and a coating comprising metal nanoparticle agglomerates adhered to at least a portion of the surface.

B. Methods for preventing or limiting biofilm formation upon an article. The methods comprise: providing an article having a surface with a coating thereon, the coating comprising metal nanoparticle agglomerates adhered to at least a portion of the surface; and exposing the article to conditions subject to promoting biofilm formation upon the surface; wherein the coating at least partially inhibits formation or proliferation of a biofilm upon the surface of the article.

Each of embodiments A and B may have one or more of the following additional elements in any combination:

Element 1: wherein the surface is present upon a medical device or implant configured for implantation in vivo or application to an external tissue of a patient.

Element 2: wherein the surface is present upon a structure that is at least partially submerged or experiences periodic contact with water.

Element 3: wherein the metal nanoparticles within the metal nanoparticle agglomerates comprise copper nanoparticles, silver nanoparticles, or any combination thereof.

Element 4: wherein the metal nanoparticle agglomerates further comprise NiO, ZnO, $TiO_2$, a cobalt compound, or any combination thereof.

Element 5: wherein the metal nanoparticle agglomerates comprise a plurality of fused, partially fused, and/or unfused metal nanoparticles that are associated with one another upon the surface.

Element 6: wherein at least a portion of the metal nanoparticles are unfused with one another.

Element 7: wherein at least a majority of the metal nanoparticles within the metal nanoparticle agglomerates range from about 50 nm to about 200 nm in size.

Element 8: wherein the metal nanoparticle agglomerates range from about 0.1 micron to about 35 microns in size.

Element 9: wherein the metal nanoparticle agglomerates are present at a coverage density of about 1 $mg/in^2$ to about 5 $mg/in^2$ upon the surface.

Element 10: wherein the metal nanoparticles are copper nanoparticles comprising metallic copper and a coating comprising $Cu_2O$, CuO or any combination thereof.

Element 11: wherein the copper nanoparticles comprise about 25% to about 99% metallic copper by weight, about 0.5% to about 60% $Cu_2O$ by weight, and about 0.1% to about 20% CuO by weight.

Element 12: wherein the copper nanoparticles comprise about 45% to about 90% metallic copper by weight, about 0.5% to about 60% $Cu_2O$ by weight, and about 0.1% to about 20% CuO by weight.

Element 13: wherein the coating further comprises an adhesive, a polymer, or any combination thereof, optionally wherein the polymer is a Class VI polymer.

Element 14: wherein the adhesive is biologically compatible.

Element 15: wherein the method further comprises providing an uncoated article; applying the metal nanoparticle agglomerates to the surface of the uncoated article; and adhering the metal nanoparticle agglomerates to the surface to form the coating.

Element 16: wherein adhering comprises at least removing a surfactant coating from the metal nanoparticles.

Element 17: wherein removing the surfactant coating comprises applying heat, gas flow, vacuum, or any combination thereof to the article after applying the plurality of metal nanoparticle agglomerates thereto.

Element 18: wherein the surfactant coating comprises one or more amines.

Element 19: wherein adhering comprises contacting the metal nanoparticle agglomerates with an adhesive on the surface.

By way of non-limiting example, exemplary combinations applicable to A include, but are not limited to: 1 or 2, and 3; 1 or 2, 3 and 4; 1 or 2, and 5, 1 or 2, and 6; 1 or 2, and 7; 1 or 2, and 8; 1 or 2, and 9; 1 or 2, and 10; 1 or 2, and 13; 1 or 2, 13 and 14; 3 and 4; 3 and 5; 3 and 6; 3 and 7; 3 and 8; 3 and 9; 3 and 10; 3 and 13; 3, 13 and 14; 6 and 7; 6 and 8; 6 and 9; 6 and 10; 6 and 13; 6, 13 and 14; 7 and 8; 7 and 9; 7 and 10; 7 and 13; 7, 13 and 14; 8 and 9; 8 and 10; 8 and 13; 8, 13 and 14; 9 and 10; 9 and 13; and 9, 13 and 14. Any of the foregoing may be further applicable to B, alone or in further combination with 15; 15 and 16; 15-17; 15, 16 and 18; and 15 and 19.

Additional embodiments disclosed herein include:

C. Articles having a biocidal coating. The articles comprise: a coating comprising metal nanoparticle agglomerates adhered via an adhesive to at least a portion of a surface of the article.

C1. Articles having a biocidal coating containing a polymer. The articles comprise a coating comprising metal nanoparticle agglomerates dispersed in a polymer located upon at least a portion of a surface of the article, the coating further comprising an adhesive and the metal nanoparticle agglomerates being optionally embedded in the polymer.

D. Methods for forming a biocidal coating on an article. The methods comprise: applying a coating formulation comprising a plurality of metal nanoparticle agglomerates upon a surface of an article; and adhering the metal nanoparticle agglomerates to the surface via at least an adhesive to form a surface coating upon the article.

Embodiments C and D may have one or more of the following additional elements in any combination:

Element 1: wherein metal nanoparticles within the metal nanoparticle agglomerates comprise copper nanoparticles, silver nanoparticles, or any combination thereof.

Element 2: wherein the metal nanoparticle agglomerates further comprise NiO, ZnO, $TiO_2$, a cobalt salt, or any combination thereof.

Element 3: wherein at least a majority of the metal nanoparticles within the metal nanoparticle agglomerates range from about 50 nm to about 200 nm in size, or about 50 nm to about 250 nm in size, or about 75 nm to about 250 nm in size.

Element 4: wherein the metal nanoparticle agglomerates range from about 0.1 micron to about 35 microns in size.

Element 5: wherein the metal nanoparticle agglomerates are present at a coverage density of about 1 $mg/in^2$ to about 5 $mg/in^2$ upon the surface.

Element 6: wherein the metal nanoparticles are copper nanoparticles comprising metallic copper and a coating comprising $Cu_2O$, CuO or any combination thereof.

Element 7: wherein the copper nanoparticles comprise about 25% to about 99% metallic copper by weight, about 0.5% to about 60% $Cu_2O$ by weight, and about 0.1% to about 20% CuO by weight.

Element 8: wherein the surface is present upon a medical device or implant configured for implantation in vivo or application to an external tissue of a patient.

Element 9: wherein the metal nanoparticle agglomerates comprise a plurality of fused, partially fused, and/or unfused metal nanoparticles that are associated with one another upon the surface.

Element 10: wherein at least a portion of the metal nanoparticles are unfused with one another.

Element 11: wherein the coating further comprises a polymer in which the metal nanoparticle agglomerates are dispersed, the polymer optionally being a dissolvable or degradable polymer.

Element 12: wherein metal nanoparticles within the metal nanoparticle agglomerates have a surfactant coating thereon, and adhering further comprises removing the surfactant coating from the metal nanoparticles.

Element 13: wherein removing the surfactant coating comprises applying heat, gas flow, vacuum, or any combination thereof to the article after applying the formulation comprising the plurality of metal nanoparticle agglomerates thereto.

Element 14: wherein the surfactant coating comprises one or more amines.

Element 15: wherein the coating formulation comprises a spray formulation or a dip coating formulation.

By way of non-limiting example, exemplary combinations applicable to C, C1, and D include, but are not limited to: 1 and 2; 1 and 3; 1 and 4; 1 and 5; 1 and 6; 1, 6 and 7; 1 and 8; 1 and 9; 1 and 10; 1 and 11; 2 and 3; 2 and 4; 2 and 5; 2 and 6; 2, 6 and 7; 2 and 8; 2 and 9; 2 and 10; 2 and 11; 3 and 4; 3 and 5; 3 and 6; 3, 6 and 7; 3 and 8; 3 and 9; 3 and 10; 3 and 11; 4 and 5; 4 and 6; 4, 6 and 7; 4 and 8; 4 and 9; 4 and 10; 4 and 11; 5 and 6; 5, 6 and 7; 5 and 8; 5 and 9; 5 and 10; 5 and 11; 6 and 7; 6 or 7, and 8; 6 or 7, and 9; 6 or 7, and 10; 6 or 7, and 11; 8 and 9; 8 and 10; 8 and 11; 9 and 10; 9 and 11; and 10 and 11.

To facilitate a better understanding of the present disclosure, the following examples of preferred or representative embodiments are given. In no way should the following examples be read to limit, or to define, the scope of the invention.

EXAMPLES

Nitrile Glove Coating: An acetone/isopropanol suspension containing 3% w/w copper nanoparticles is applied to the wet nitrile glove layer when emerging from a dip coating bath. Application is made using a commercially available spray setup with an application tip that is 1.8 mm or less in diameter. Going back and forth, the material is sprayed at a distance of 4-6" away from the surface on the glove's palm side in single steady strokes with about a 10% overlap, one pass only. After polymerization, the copper nanoparticles are embedded in the surface of the glove with a well dispersed load of about 3 mg/in$^2$.

Thin Copper Layer Coating on Metal: An acetone/isopropanol suspension containing 6% w/w copper nanoparticles and 0.4% w/w of an epoxy binder is applied to a solid surface using a commercially available airless sprayer (e.g., Graco Ultra 2000) using an application tip that is 1.8 mm or less in diameter. Going back and forth, the material is sprayed at a distance of 4-6" away from the surface in single steady strokes with about a 10% overlap, one pass only. At a layer thickness of 50-100 nm, 1 fluid ounce of such an ink can cover approximately 125-250 ft$^2$ of surface area. The resultant coating has a well dispersed copper load of about 5-6 mg/in$^2$.

Thick Copper Layer Coating on Metal: A paint containing 84% w/w copper nanoparticles in an alcohol binder mixture was applied to a solid surface using a sponge or paintbrush in the form of a thick layer. After drying 24 h in air, a tack-free surface ready to be touched was obtained. At a layer thickness of 500 microns, 1 fluid ounce of such a paint can cover approximately 25 ft$^2$ of surface area. The resultant solid copper coating covers the entire surface.

Copper-Containing Polymer Coating on Metal: A polyurethane paint containing 10% w/w copper nanoparticles was applied by spraying or brushing on a metal surface using a sponge or paintbrush in the form of a thick layer (100-1000 microns in thickness). After drying 24 h in air, a tack-free surface ready to be touched was obtained. At a layer thickness of 500 microns, 1 fluid ounce of such a paint can cover approximately 25 ft$^2$ of surface area. The resultant coating containing copper nanoparticles dispersed in polymer covers the entire surface.

Copper-Containing Thermoplastic Polymer: A thermoplastic polyurethane containing 20% w/w copper nanoparticles is formed into medical devices like stents via injection molding or extrusion. After solidifying/cooling and hardening, a tack-free device results that is ready for use. The resultant device surface is rendered biocidal via the copper nanoparticles in agglomerate form that are dispersed throughout the polymer and at least a portion of which sit on the surface of the device.

Fabric Coating #1: Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 20-50 nm thick, and the metal nanoparticle agglomerates were partially embedded in the adhesive layer with a substantial portion still exposed. The areal coverage of the agglomerates upon the fiber surfaces was about 20-50%. The copper loading upon the fabric ranged from about 1.2 mg/in$^2$ to about 2.7 mg/in$^2$. Depending on size, some of the agglomerates may have the surfactant layer partially removed, thereby resulting in partial oxidation and an overall mixture of copper metal, Cu$_2$O and CuO species on the fiber surface. The copper metal to oxide ratio may reside in the 1-10% range. Over time, oxidation and dissolution progressively result in fading of the initial dark brown-red color to more light yellow-green (see FIG. 7). The nanoparticle-loaded fabric was then subjected to various stability and toxicological tests specified below.

Fabric Coating #2: Agglomerates of copper nanoparticles in the 20-150 nm size range with a partially removed monolayer of amine surfactants on their surfaces and having an agglomerate size of 5-15 microns were adhered to a 30/70 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 50-100 nm thick and the metal nanoparticle agglomerates were partially embedded in the adhesive layer with a substantial portion still exposed. The areal coverage of the agglomerates upon the fiber surfaces was about 30-70%. The copper loading upon the fabric ranged from about 2.3 mg/in$^2$ to about 4.5 mg/in$^2$. Depending on size, some of the agglomerates may be fully or partially oxidized, thereby resulting in an overall mixture of copper metal, Cu$_2$O and CuO species on the fiber surface. The copper metal to oxide ratio may reside in the 5-25% range.

Fabric Coating #3: Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 100-250 nm thick, and the metal nanoparticle agglomerates were partially embedded in the adhesive layer with a substantial portion still exposed. The areal coverage of the agglomerates upon the fiber surfaces was about 10-35%. The copper loading upon the fabric ranged from about 1.7 mg/in$^2$ to about 3.5 mg/in$^2$. Depending on size, some of the agglomerates may be fully or partially oxidized, thereby resulting in an overall mixture of copper metal, Cu$_2$O and CuO species on the fiber fabric surface. The copper metal to oxide ratio may reside in the 5-15% range.

Fabric Coating #4: Agglomerates of copper nanoparticles in the 50-200 nm size range with a monolayer of amine surfactants on their surfaces and having an agglomerate size of 1-35 microns were adhered to a 100% polypropylene fabric (melt-blown) with an average fiber diameter of about 10 microns using an epoxy adhesive. This may be done via spray coating a suitable ink or dye formulation onto the fibers, or dip coating or gravure coating via a commercial process. The adhesive layer was about 35-150 nm thick, and the metal nanoparticle agglomerates were partially embedded in the adhesive layer with a substantial portion still exposed. The areal coverage of the agglomerates on the fiber surfaces was about 5-30%. The copper loading upon the fabric ranged from about 0.7 mg/in$^2$ to about 1.6 mg/in$^2$. Depending on size, some of the agglomerates may be fully or partially oxidized, thereby resulting in an overall mixture of copper metal, Cu$_2$O and CuO species on the fiber surface. The copper metal to oxide ratio may reside in the 1-5% range.

Fabric Coating #5: Agglomerates of copper nanoparticles in the 35-200 nm size range with a monolayer of amine surfactants on their surfaces and having an agglomerate size of 3-25 microns were adhered to a 100% cotton fabric with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 50-150 nm thick, and the metal nanoparticle agglomerates were partially embedded in the adhesive layer with a substantial portion still exposed. The areal coverage of the agglomerates upon the fiber surfaces was about 40-75%. The copper loading upon the fabric ranged from about 2.7 mg/in$^2$ to about 4.5 mg/in$^2$. Depending on size, some of the agglomerates may be fully or partially oxidized, thereby resulting in an overall mixture of copper metal, $Cu_2O$ and CuO species on the fiber surface. The copper metal to oxide ratio may be in the 3-25% range.

When the foregoing fabrics were utilized as dry wipes for disinfection of a hard surface, wiping the hard surface for just 5 seconds may result in full sterilization of a wide range of microbes, viruses and bacteria. Depending on the frequency of use, such dry wipes may remain effective for up to about 30 days. After use, the dry wipes may self-sterilize (e.g., in about 5 minutes or less) for frequent and rapid reuse. Since the pathogens are killed or inactivated upon contact, transfer and cross-contamination is unlikely to occur. The fabric is protected from biofilm formation, even when remaining wet (e.g., damp kitchen towels or bath towels). Further, no bacterial transfer from surface to surface occurs.

Stability testing. A 6"×6" sheet of fabric was tumbled in water for 8 hours. Only 1.4% of the available copper by weight (0.54 mg) was released into the water.

Shedding was also determined by exposing the fabric to simulated breathing conditions (8.4 and 40.8 m/min face velocity gas flow) and analyzing a filter trap for liberated copper by SEM or EDS. The shedding tests did not reveal detectable liberation of copper from the fabric.

VOCs. No volatile organic compounds (VOCs) from a battery of 70 standard VOCs were detected as being released from the fabric when tested under standard conditions.

Direct exposure to cell growth media. A piece of fabric was first soaked in supplemented cell growth media for up to an hour and then removed. Thereafter, Vero cells or Calu-3 lung epithelial cells were immersed in the cell growth media and incubated overnight in a $CO_2$ incubator. Cell viability was determined by assessing ATP production using a luminescence assy. The luminescence assay did not reveal a substantial change in cell viability.

Efficacy. Efficacy of the fabric against a panel of bacterial and viral pathogens was tested. The panel included gram-positive, gram-negative, and antibiotic-resistant bacteria, bacteriophages as representatives of non-enveloped viruses, enveloped viruses such as H1N1 flu, H3N2 flu, and SARS-CoV-2, and non-enveloped viruses such as feline calicivirus. In all cases, >99% kill rates were observed within 30 seconds, and full efficacy was maintained over at least 15 days of repeated daily exposure. The efficacy was >99.9% over a standard EPA exposure time of 2 hours against *Staphylococcus aureus* (ATCC 6538), *Enterobacter aerogenes* (ATCC 13048), *Pseudomonas aeruginosa* (ATCC 15442), Methicillin Resistant *Staphylococcus aureus* MRSA (ATCC 33592), and *Escherichia coli* O157:H7 (ATCC 35150). The fabric maintained substantially 100% of the original efficacy against repeated viral inocculations (27M PFUs; H1N1, H3N2 and feline calicivirus) or bacterial loads introduced to the fabric over the course of 30 days. The fabric maintained >99.9% efficacy against *Staphylococcus aureus* and *Klebsiella aerogenes* after months of daily high-touch use and moisture exposure with visible wear. An inactivation rate of substantially 100% was realized against human wound pathogens such as *Acinetobacter baumannii, Klebsiella pneumonia, Pseudomonas aeruginosa, Enterococcus faecalis*, Methicillin-resistant *Staphylococcus aureus* (MRSA), and *Staphylococcus epidermidis* over 24 hours.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the features of the present disclosure are presented herein. Not all features of a physical implementation are described or shown in this application for the sake of clarity. It is understood that in the development of a physical embodiment incorporating the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The disclosure herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. An article comprising:
   a coating comprising metal nanoparticle agglomerates dispersed in a dissolvable or degradable polymer, wherein the dissolvable or degradable polymer comprises at least one of polyvinyl alcohol, polylactic acid, and polyglycolic acid,
   wherein the metal nanoparticle: agglomerates are dispersed in the dissolvable or degradable polymer at about 0.5 to about 25 wt. % with respect to the polymer mass; and
   wherein the coating is adhered via an adhesive to at least a portion of a surface of the article.

2. The article of claim 1, wherein the metal nanoparticle agglomerates comprise a plurality of metal nanoparticles that are fused, partially fused, and/or unfused and are associated with one another upon the surface.

3. The article of claim 2, wherein metal nanoparticles within the metal nanoparticle agglomerates comprise copper nanoparticles, silver nanoparticles, or any combination thereof.

4. The article of claim 3, wherein the metal nanoparticle agglomerates further comprise an additive for producing reactive oxygen species, wherein the additive for producing reactive oxygen species comprises NiO, ZnO, $TiO_2$, a cobalt salt, or any combination thereof.

5. The article of claim 2, wherein at least a portion of the metal nanoparticles are unfused with one another when the metal nanoparticle agglomerates are adhered to the surface.

6. The article of claim 1, wherein at least a majority of the metal nanoparticles within the metal nanoparticle agglomerates range from about 50 nm to about 250 nm in size.

7. The article of claim 1, wherein the metal nanoparticle agglomerates range from about 0.1 micron to about 35 microns in size.

8. A method comprising:
   applying a coating formulation comprising a plurality of metal nanoparticle agglomerates dispersed in a dissolvable or degradable polymer, wherein the dissolvable or degradable polymer comprises at least one of polyvinyl alcohol, polylactic acid, and polyglycolic acid upon a surface of an article;
   wherein the metal nanoparticle agglomerates are dispersed in the dissolvable or degradable polymer at about 0.5 to about 25 wt. % with respect to the polymer mass; and adhering the metal nanoparticle agglomerates to the surface via at least an adhesive to form a coating upon the surface of the article.

9. The method of claim 8, wherein the metal nanoparticle agglomerates comprise a plurality of metal nanoparticles that are fused, partially fused, and/or unfused and are associated with one another upon the surface.

10. The method of claim 9, wherein metal nanoparticles within the metal nanoparticle agglomerates comprise copper nanoparticles, silver nanoparticles, or any combination thereof.

11. The method of claim 10, wherein the metal nanoparticle agglomerates further comprise an additive for producing reactive oxygen species, wherein the additive for producing reactive oxygen species comprises NiO, ZnO, $TiO_2$, a cobalt salt, or any combination thereof.

12. The method of claim 8, wherein metal nanoparticles within the metal nanoparticle agglomerates have a surfactant coating thereon, and adhering further comprises removing the surfactant coating from the metal nanoparticles.

13. The method of claim 12, wherein removing the surfactant coating comprises applying heat, gas flow, vacuum, or any combination thereof to the article after applying the coating formulation thereto.

14. The method of claim 13, wherein removing the surfactant coating takes place below a fusion temperature of the metal nanoparticles.

15. The method of claim 8, wherein at least a majority of the metal nanoparticles within the metal nanoparticle agglomerates range from about 50 nm to about 250 nm in size.

16. The method of claim 8, wherein the metal nanoparticle agglomerates range from about 0.1 micron to about 35 microns in size.

17. The method of claim 8, wherein the coating formulation is applied to the surface of the article by spray coating or dip coating.

18. An article comprising:
   a coating comprising metal nanoparticle agglomerates and metal salt compounds, wherein the metal nanoparticle agglomerates comprise copper nanoparticles, and wherein the coating is adhered via an adhesive to at least a portion of a surface of the article;
   wherein the nanoparticle agglomerates and metal salt compounds are dispersed in a dissolvable or degradable polymer, wherein the dissolvable or degradable polymer comprises at least one of polyvinyl alcohol, polylactic acid, and polyglycolic acid; and
   wherein the metal nanoparticle agglomerates are dispersed in the dissolvable or degradable polymer at about 0.5 to about 25 wt. % with respect to the polymer mass.

19. The article according to claim 18, wherein the metal salt compounds comprise one or more of chlorides, bisulfites, and bicarbonates.

* * * * *